United States Patent
Yamamoto

(10) Patent No.: US 8,714,178 B2
(45) Date of Patent: May 6, 2014

(54) VALVE STEM CONNECTION STRUCTURE OF PRESSURE REDUCING VALVE AND METHOD THEREFOR

(75) Inventor: Hiroaki Yamamoto, Miyagi (JP)

(73) Assignee: Keihin Corporation, Tokyo (JP)

( * ) Notice: Subject to any disclaimer, the term of this patent is extended or adjusted under 35 U.S.C. 154(b) by 211 days.

(21) Appl. No.: 13/395,372

(22) PCT Filed: Sep. 10, 2010

(86) PCT No.: PCT/JP2010/065607
§ 371 (c)(1),
(2), (4) Date: Mar. 9, 2012

(87) PCT Pub. No.: WO2011/040209
PCT Pub. Date: Apr. 7, 2011

(65) Prior Publication Data
US 2012/0175545 A1   Jul. 12, 2012

(30) Foreign Application Priority Data
Sep. 30, 2009   (JP) .................... 2009-227905

(51) Int. Cl.
*F16K 31/00*   (2006.01)
(52) U.S. Cl.
USPC ............... 137/15.17; 137/315.05; 251/61.2
(58) Field of Classification Search
USPC .............................. 137/315.05, 15.17, 15.18; 251/61.1–61.4, 331
See application file for complete search history.

(56) References Cited

U.S. PATENT DOCUMENTS

| | | | | |
|---|---|---|---|---|
| 3,547,143 A | * | 12/1970 | Mills, Jr. ................ | 137/315.05 |
| 4,240,458 A | * | 12/1980 | Huff ...................... | 137/315.05 |
| 5,288,052 A | | 2/1994 | Black et al. | |
| 5,443,083 A | | 8/1995 | Gotthelf | |
| 8,408,515 B2 | * | 4/2013 | Yamamoto et al. ........ | 251/61.5 |
| 2005/0109403 A1 | | 5/2005 | Gotthelf | |

FOREIGN PATENT DOCUMENTS

| | | |
|---|---|---|
| CN | 101205985 A | 6/2008 |
| EP | 1 715 400 A1 | 10/2006 |
| JP | 50-147925 A | 12/1975 |

(Continued)

OTHER PUBLICATIONS

Official Communication cited in Chinese Application No. 201080043636.4, dated Mar. 13, 2013, 5 pages.

(Continued)

*Primary Examiner* — Kevin Lee
(74) *Attorney, Agent, or Firm* — Arent Fox LLP

(57) ABSTRACT

In a valve stem connection structure of a pressure reducing valve, an insertion recess portion (72) opened toward a valve mechanism is coaxially provided in a diaphragm rod (68); a reduced diameter stem portion (30a) and a pair of enlarged diameter stem portions (30b, 30c) are provided in one end portion of the valve stem (30); a holding plate (74) is inserted into the insertion recess portion (72) while the reduced diameter stem portion (30a) is loosely inserted into the engaging recess portion (73); and an engaging ring (78) expandable and contractable in a radial direction of the valve stem (30) is engaged with an arc-shaped first engaging groove (76) provided in an outer periphery of the holding plate (74) and an annular second engaging groove (77) provided in an inner periphery of the insertion recess portion (72).

3 Claims, 14 Drawing Sheets

(56) References Cited

FOREIGN PATENT DOCUMENTS

| JP | 59-188376 | U | 12/1984 |
| JP | 61-161475 | U | 10/1986 |
| JP | 62-75180 | A | 4/1987 |
| JP | 60-88380 | A | 4/1988 |
| JP | 2-97779 | A | 4/1990 |
| JP | 2-119504 | U | 9/1990 |
| JP | 2002-180907 | A | 6/2002 |
| JP | 2005-299873 | A | 10/2005 |
| JP | 2008-269459 | A | 11/2008 |
| JP | 2010-198587 | A | 9/2010 |

OTHER PUBLICATIONS

Supplementary European Search Report issued in Application No. 10 82 0329, dated Oct. 10, 2013, 2 pages.

* cited by examiner

VALVE STEM CONNECTION STRUCTURE OF PRESSURE REDUCING VALVE AND METHOD THEREFOR

CROSS-REFERENCE TO RELATED APPLICATION

This Application is a National Stage entry of International Application No. PCT/JP2010/065607 having an international filing date of Sep. 10, 2010; which claims priority to Japanese Application No.: 2009-227905, filed Sep. 30, 2009; the disclosure of each of which is hereby incorporated in its entirety by reference.

TECHNICAL FIELD

The present invention relates to improvements of a valve stem connection structure of a pressure reducing valve for connecting a valve stem to a diaphragm rod joined to a center portion of a diaphragm, the valve stem coaxially joined to a valve body of a valve mechanism housed in a body, and a method therefor.

BACKGROUND ART

A pressure reducing valve in which a valve stem coaxially joined to a valve body of a valve mechanism is connected to a center portion of a diaphragm is known from Patent Document 1.

PRIOR ART DOCUMENT

Patent Document

Patent Document 1: Japanese Patent Application Laid-open No. 2002-180907

SUMMARY OF INVENTION

Problems to be Solved by the Invention

However, in the pressure reducing valve disclosed in Patent Document 1 described above, the valve stem is connected to the diaphragm by sequentially stacking an O-ring, a first retainer, the diaphragm, a second retainer, and a washer on the valve stem, and then fastening these parts by screwing a nut to the center of the valve stem. In such a connection structure, inclination of the diaphragm with respect to a surface orthogonal to a valve stem direction and displacement of an axis of the diaphragm side and an axis of the valve body side is not allowed, and strict dimensional control is thereby required. To counter this problem, the applicant has already filed an application of the following pressure reducing valve (Japanese Patent Application No. 2009-112808). A T-shaped engaging portion provided in one end portion of a valve stem joined to a valve body loosely engages with a T-shaped engaging groove provided in an insertion member inserted into the diaphragm rod and fixed thereto by using a C-shaped engaging ring. Thus, the valve stem is connected to the diaphragm rod. In such a connection structure, the valve stem can be connected to the diaphragm rod with a simple and secure structure requiring no strict dimensional control.

However, the T-shaped engaging groove provided in the insertion member for engagement with the T-shaped engaging portion in the one end portion of the valve stem has a complex shape including a recess portion which is formed by cutting off part of the insertion member in a direction orthogonal to a center axis of the insertion member and which is asymmetrical with respect to the center axis of the insertion member. Thus, the engaging groove cannot be formed by a lathing process which is low in cost, and the formation thereof is costly.

The present invention is made in view of the circumstances described above, and an object of the present invention is to provide a connection structure capable of connecting a valve stem to a diaphragm rod with a simple structure low in manufacturing cost while allowing inclination of the diaphragm with respect to a surface orthogonal to a valve stem direction and displacement of an axis of a diaphragm side and an axis of a valve body side, and to provide a connection method improved in assemblability by using such a connection structure.

Means for Solving the Problems

In order to attain the above object, according to a first aspect of the present invention, there is provided a valve stem connection structure of a pressure reducing valve for connecting a valve stem to a diaphragm rod joined to a center portion of a diaphragm, the valve stem coaxially joined to a valve body of a valve mechanism housed in a body, characterized in that an insertion recess portion opened toward the valve mechanism is coaxially provided in the diaphragm rod, a reduced diameter stem portion and a pair of enlarged diameter stem portions are provided in one end portion of the valve stem, the enlarged diameter stem portions provided respectively on opposite sides in an axial direction of the reduced diameter stem portion and each having a diameter larger than that of the reduced diameter stem portion, a holding plate formed to have a substantially U-shaped cross section while having an engaging recess portion opened to one side with a width larger than an outer diameter of the reduced diameter stem portion but smaller than outer diameters of the enlarged diameter stem portions is inserted into the insertion recess portion while the reduced diameter stem portion is loosely inserted into the engaging recess portion and thus the one end portion of the valve stem is held by the holding plate to be immovable relative to the holding plate in the axial direction, and the holding plate and the diaphragm rod are connected to each other by causing an engaging ring expandable and contractable in a radial direction of the valve stem to engage with an arc-shaped first engaging groove provided in an outer periphery of the holding plate and an annular second engaging groove provided in an inner periphery of the insertion recess portion to correspond to the first engaging groove.

Furthermore, according to a second aspect of the present invention, in addition to the configuration of the first aspect, the engaging ring having a substantially C-shape engages with the first engaging groove and the second engaging groove in such a way that an open end of the engaging ring is disposed at a position displaced from an open end of the engaging recess portion on the one side.

Furthermore, according to a third aspect of the present invention, there is provided a method of connecting the valve stem of a pressure reducing valve, wherein, when the valve stem connection structure of a pressure reducing valve according to the first or second aspect is used to connect the valve stem to the diaphragm rod, the diaphragm rod with a first retainer which is separate from the diaphragm rod and which is interposed between the diaphragm rod and a center portion of one surface of the diaphragm or a diaphragm rod integrally having a first retainer which is in contact with the center portion of the one surface of the diaphragm is coaxially provided with a shaft portion penetrating the diaphragm and a second retainer which is in contact with a center portion of the other surface of the diaphragm, the shaft portion is crimped to engage with the second retainer, and thus a diaphragm assembly including at least the diaphragm, the first retainer, the second retainer, and the diaphragm rod is assembled in advance, and the one end portion of the valve stem is connected to the diaphragm rod of the diaphragm assembly by using the holding plate and the engaging ring.

Effects of the Invention

With the first aspect of the present invention, the reduced diameter stem portion and the pair of enlarged diameter stem portions are provided in the one end portion of the valve stem, the enlarged diameter stem portions provided respectively on opposite sides in the axial direction of the reduced diameter stem portion and each having a diameter larger than that of the reduced diameter stem portion; the holding plate formed to have the substantially U-shaped cross section while having the engaging recess portion opened to one side is inserted into the insertion recess portion opened toward the valve mechanism and provided coaxially in the diaphragm rod while the reduced diameter stem portion is loosely inserted into the engaging recess portion and thus the one end portion of the valve stem is held by the holding plate; and the holding plate and the diaphragm rod are connected to each other by causing the engaging ring to engage with the arc-shaped first engaging groove provided in the outer periphery of the holding plate and the annular second engaging groove provided in the inner periphery of the insertion recess portion. Thus, the valve stem can be connected to the diaphragm rod with a simple structure using the diaphragm rod and the holding plate which are easily processed and having a low manufacturing cost, while an inclination of the diaphragm with respect to a surface orthogonal to the valve stem direction and displacement of the axis of the diaphragm side and the axis of the valve body side are allowed.

With the second aspect of the present invention, the valve stem and the diaphragm rod are connected to each other in such way that the holding plate does not disengage from the valve stem. Thus, an assembly work is facilitated.

With the third aspect of the present invention, the shaft portion coaxially provided in the diaphragm rod and penetrating the diaphragm and the second retainer which is in contact with the center portion of the other surface of the diaphragm is crimped to engage with the second retainer, and thus the diaphragm assembly including at least the diaphragm, the first retainer, the second retainer, and the diaphragm rod is assembled in advance. Thus, the pressure reducing valve can be manufactured in the following way. The diaphragm assemblies are assembled in a large number in advance by crimping, and the one end portion of the valve stem is connected to the diaphragm rod of each diaphragm assembly by using the holding plate and the engaging ring. This facilitates the assembly work of the pressure reducing valve while allowing the inclination of the diaphragm with respect to the surface orthogonal to the valve stem direction and the displacement of the axis of the diaphragm side and the axis of the valve body side.

MODE FOR CARRYING OUT THE INVENTION

An embodiment of the present invention is described below with reference to FIGS. 1 to 14.

First Embodiment

Figure 1:
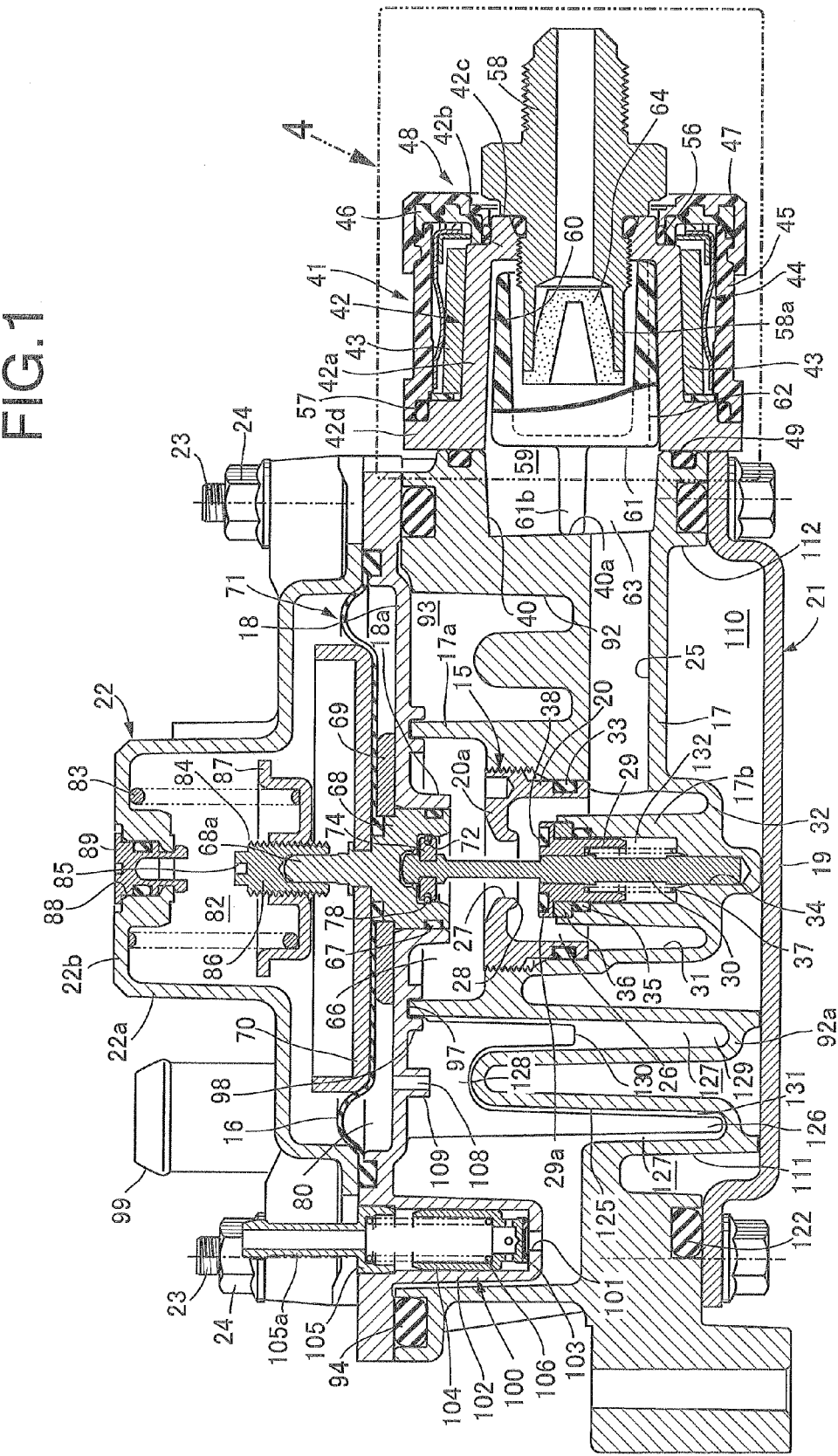
FIG. 1 is a longitudinal cross-sectional view of a pressure reducing valve for LPG fuel. (First Embodiment)
Figure 2:
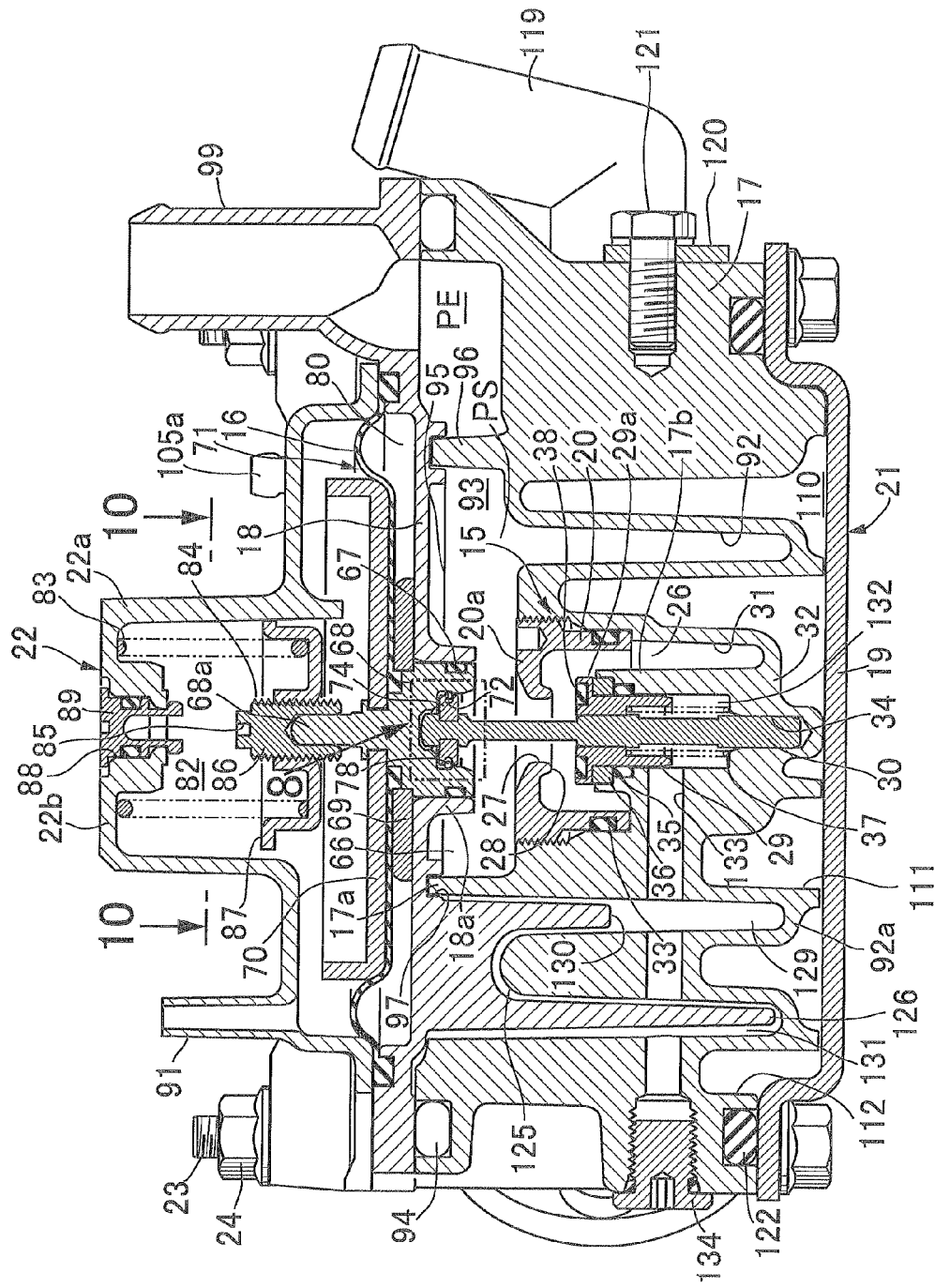
FIG. 2 is a longitudinal cross-sectional view of the pressure reducing valve for LPG fuel which is taken along a cut surface different from FIG. 1. (First Embodiment)

At first, referring to FIGS. 1 and 2, this pressure reducing valve for LPG fuel is one for reducing the pressure of LPG fuel and then supplying it to an engine (not illustrated). The pressure reducing valve includes a valve mechanism 15 and a diaphragm 16 for driving the valve mechanism 15 to open and close.

Figure 3:
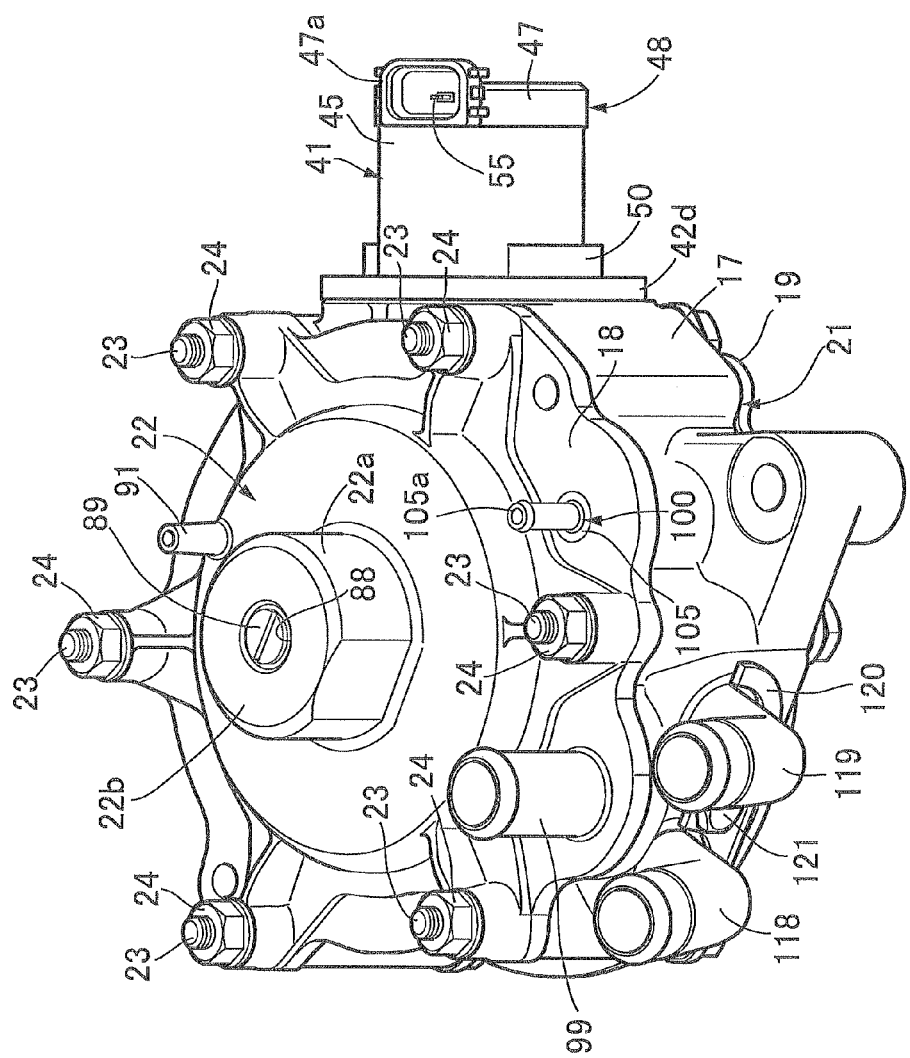
FIG. 3 is a perspective view of the pressure reducing valve for LPG fuel. (First Embodiment)

Referring also to FIG. 3, a valve housing 21 of the valve mechanism 15 is formed of a body 17, a gas passage cover member 18 fastened to one surface of the body 17, a heating fluid passage cover member 19 fastened to the other surface of the body 17, and a valve seat member 20 (see FIGS. 1 and 2) screwed to the body 17. A diaphragm cover 22 which holds a peripheral edge portion of the diaphragm 16 between the diaphragm cover 22 and the gas passage cover member 18 is fastened together with the body 17, the gas passage cover member 18, and the heating fluid passage cover member 19 by multiple bolts 23 . . . and multiple nuts 24 . . . .

The valve mechanism 15 is housed in the body 17, and includes a valve body 29 and a valve stem 30. The valve body 29 faces a valve chamber 26 communicating with a high-pressure gas passage 25, and can seat on a valve seat 28 having a valve hole 27 opened in a center portion thereof. The valve stem 30 is connected to the diaphragm 16 operating in accordance with a gas pressure downstream of the valve seat 28, and is continuous with the valve body 29.

The body 17 is provided with a cylinder portion 17a disposed in a center portion of the body 17. The cylinder portion 17a is provided with a bottomed attachment hole 31. One end of the attachment hole 31 is opened to the one surface side of the body 17 and the other end is closed with an end wall 32.

The attachment hole 31 has such a stepped shape that the diameter thereof becomes smaller stepwise toward the end wall 32.

The valve seat member 20 has a flange portion 20a in one end thereof, and has a cylindrical shape, the flange portion 20a projecting inward in a radial direction. The annular valve seat 28 having the valve hole 27 opened in the center portion thereof is formed in a center of the flange portion 20a. The valve seat member 20 is inserted and fixed to an intermediate portion of the attachment hole 31 in an axial direction by being screwed to the body 17, and an annular first sealing member 33 elastically in contact with an inner surface of the intermediate portion of the attachment hole 31 in the axial direction is attached to an outer periphery of the valve seat member 20.

A center cylinder portion 17b, which is disposed in a center portion in the cylinder portion 17a with one end thereof disposed at a position corresponding to an intermediate portion of the valve seat member 20 in the axial direction, has the other end thereof provided integrally with the end wall 32 closing the other end of the attachment hole 31. A guide hole 34 which has a bottom and which has a diameter smaller than an inner diameter of the center cylinder portion 17b is provided in the end wall 32 to be coaxially continuous with the center cylinder portion 17b.

The valve body 29 having a flange portion 29a at one end is slidably fitted to the center cylinder portion 17b, the flange portion 29a projecting outward in the radial direction. An annular second sealing member 35 in sliding contact with an outer periphery of the valve body 29 is attached to a portion of an inner surface of the center cylinder portion 17b which is close to the one end. An annular retainer 36 which prevents detachment of the second sealing member 35 from the center cylinder portion 17b is fitted and fixed to an open end of the center cylinder portion 17b. When the flange portion 29a comes into contact with the retainer 36, an end of movement of the valve body 29 in a direction away from the valve seat 28 is restricted.

Incidentally, the valve body 29 is driven in an axial direction by the diaphragm 16. In order to improve following capability of the valve body 29 to the operation of the diaphragm 16, a coil-shaped spring 37 is provided in a compressed state in the center cylinder portion 17b between the end wall 32 and the valve body 29, the spring 37 biasing the valve body 29 in such a direction that the flange portion 29a approaches the valve seat 28. A set load of the spring 37 is set to an extremely small value which is enough to cause the valve body 29 to follow the diaphragm 16. Moreover, an annular third sealing member 38 capable of seating on the valve seat 28 is attached to the flange portion 29a.

An intermediate portion of the valve stem 30 coaxially penetrating the valve body 29 is joined to the valve body 29. One end side of the valve stem 30 loosely penetrates the valve hole 27 and is connected to the diaphragm 16, and the other end portion of the valve stem 30 is slidably fitted to the guide hole 34.

The valve chamber 26 is formed around the center cylinder portion 17b between the end wall 32 and the valve seat member 20 hermetically inserted and fixed to the intermediate portion of the cylinder portion 17a. Meanwhile, the body 17 is provided with an inlet-side connection hole 40 opened in a side surface of the body 17 and the high-pressure gas passage 25 having one end opened to an inner end of the inlet-side connection hole 40 and the other end communicating with the valve chamber 26.

Figure 4:
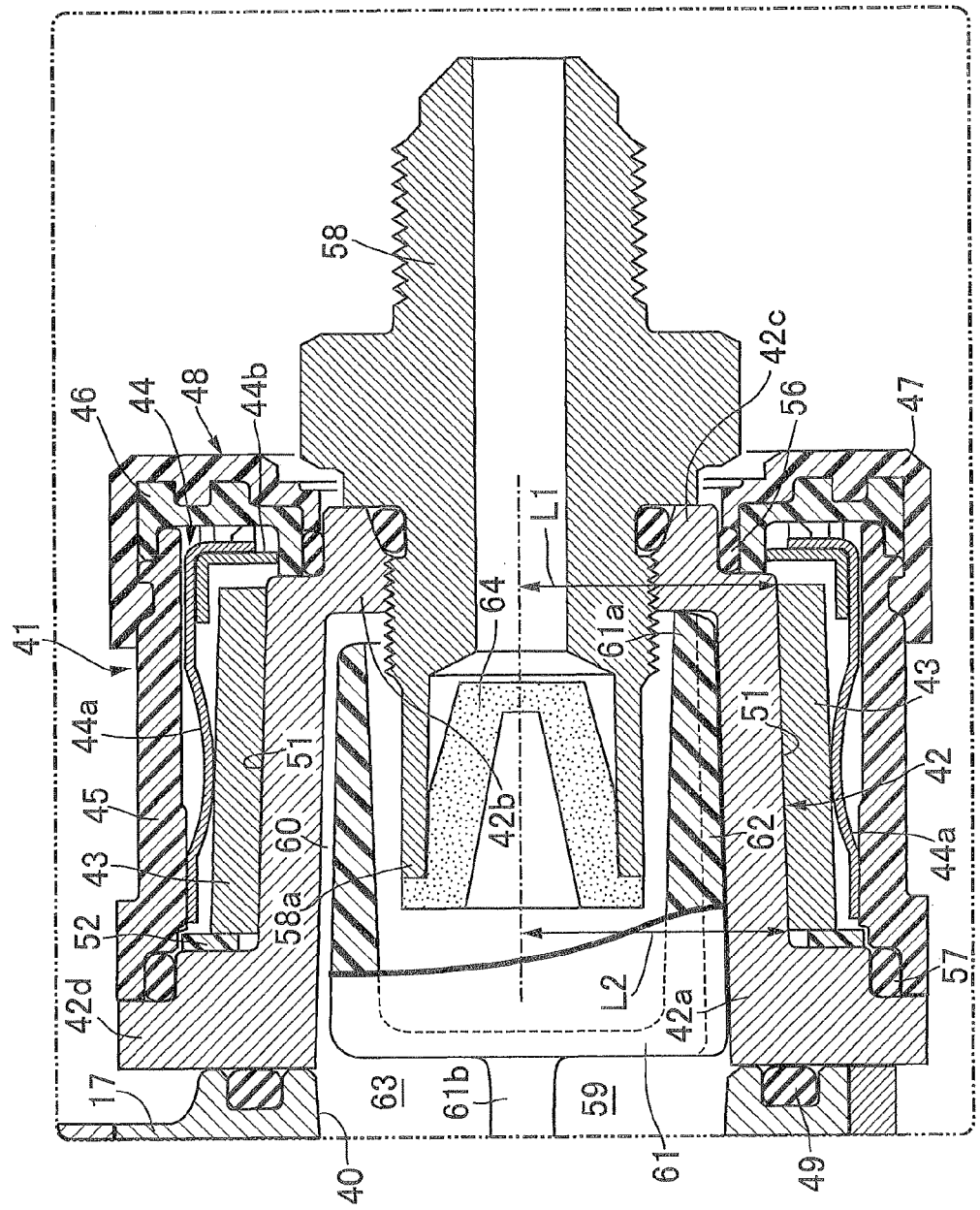
FIG. 4 is an enlarged view of a portion indicated by an arrow 4 in FIG. 1. (First Embodiment)
Figure 5:
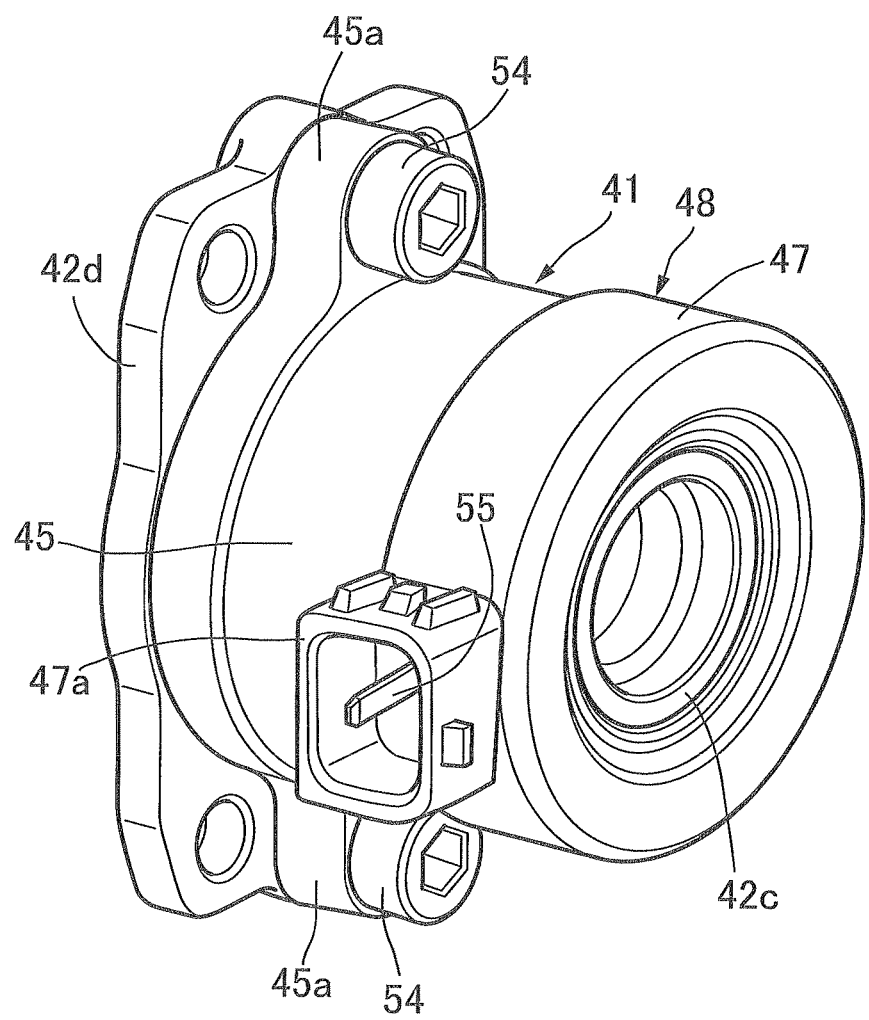
FIG. 5 is a perspective view of a PTC heater unit. (First Embodiment)

Referring also to FIGS. 4 and 5, a PTC heater unit 41 is attached to the side surface of the body 17 at a position corresponding to the inlet-side connection hole 40.

The PTC heater unit 41 is formed of a metal inner case 42 fastened to the side surface of the body 17, multiple, for example six PTC elements 43, 43 . . . disposed on an outer periphery of the inner case 42, and a current-carrying-portion-side assembly 48. The current-carrying-portion-side assembly 48 includes a current-carrying member 44 and a tubular outer case 45, and covers the inner case 42 with the PTC elements 43, 43 . . . interposed between the current-carrying-portion-side assembly 48 and the inner case 42.

Figure 6:
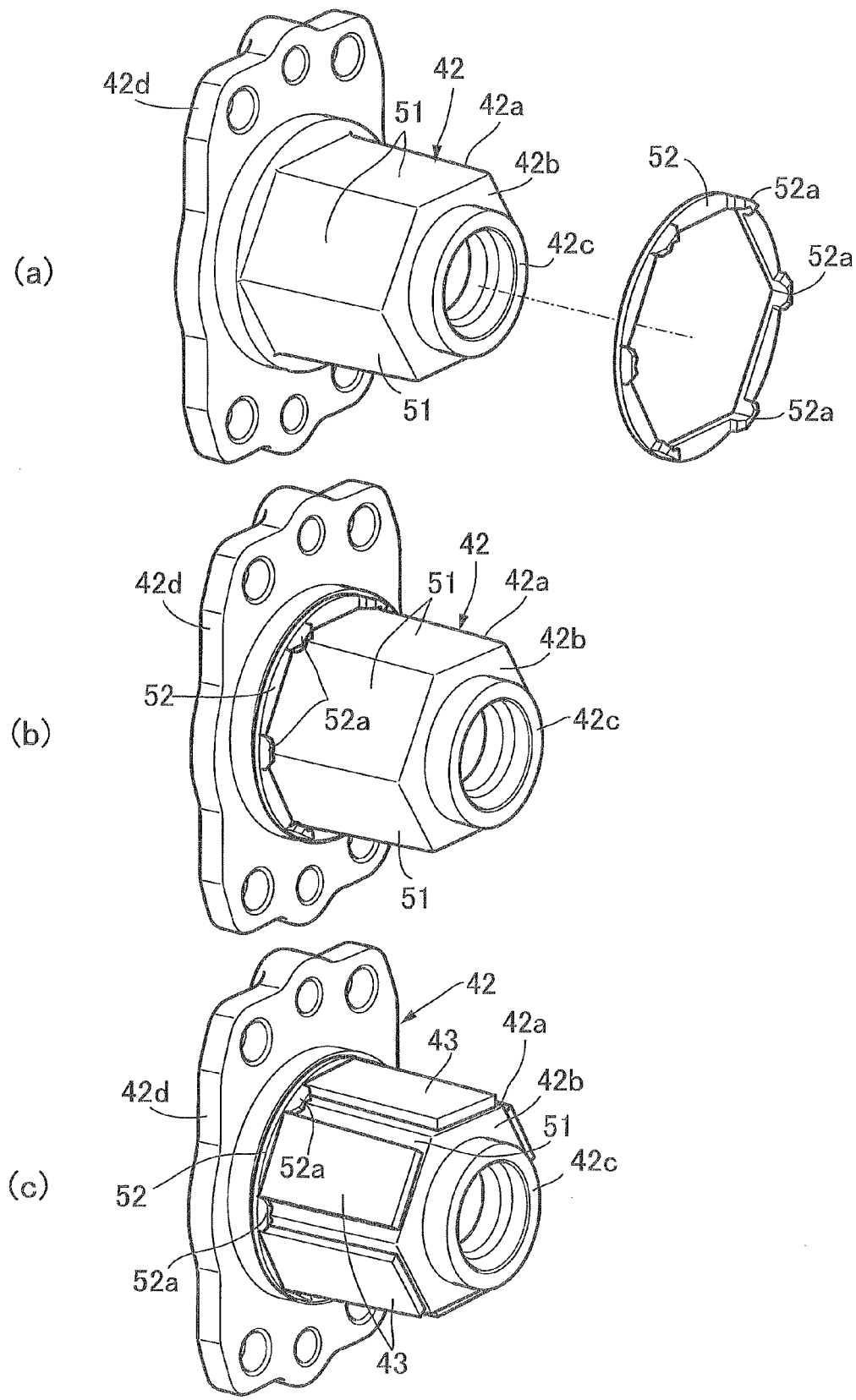
FIG. 6 is a perspective view sequentially showing a process of attaching a PTC holding member and PTC elements to an inner case. (First Embodiment)

Referring also to FIG. 6, the inner case 42 integrally has a base tube portion 42a, an inwardly-projecting flange portion 42b, a connection tube portion 42c, and a flange portion 42d. The base tube portion 42a has an inner peripheral surface continuous and flush with an inner periphery of the inlet-side connection hole 40 of the body 17 The inwardly-projecting flange portion 42b projects inward from one end of the base tube portion 42a in a radial direction. The connection tube portion 42c is continuous with an inner periphery of the inwardly-projecting flange portion 42b, and protrudes outward in an axial direction. The flange portion 42d projects outward from the other end of the base tube portion 42a in the radial direction. The flange portion 42d is fastened to the body 17 by multiple bolts 50 . . . with an annular fourth sealing member 49 interposed between the flange portion 42d and the side surface of the body 17. The base tube portion 42a is directly connected to the body 17 to be attachable and detachable.

An outer peripheral surface of the base tube portion 42a is formed to have a polygonal shape, for example a hexagonal shape having multiple, for example six flat supporting surfaces 51, 51 . . . which are respectively in contact with and support the flat-plate shaped PTC elements 43, 43 . . . . The multiple PTC elements 43, 43 . . . are arranged on the outer peripheral surface of the base tube portion 42a in a polygonal shape in a view seen from a direction along an axis of the base tube portion 42a.

Each of the supporting surfaces 51, 51 . . . is formed as an inclined surface inclined in such a way that the surface becomes closer to the center of the base tube portion 42a toward the one end of the base tube portion 42a in the axial direction. Specifically, as shown in FIG. 4, a distance L1 from the supporting surface 51 to the center axis of the base tube portion 42a on the one end side of the base tube portion 42a in the axial direction is set to be smaller than a distance L2 from the supporting surface 51 to the center axis of the base tube portion 42a on the other end side of the base tube portion 42a in the axial direction (L1<L2).

As shown in FIGS. 6(a), 6(b), 6(c), an annular PTC holding member 52 made of a synthetic resin is brought into contact with the flange portion 42d from the one end side of the base tube portion 42a in the axial direction. End portions, on a side close to the flange portion 42d, of the respective PTC elements 43, 43 . . . are brought into contact with the PTC holding member 52 as shown in FIG. 6(c), the PTC elements 43, 43 . . . disposed respectively on the supporting surfaces 51, 51 . . . in the outer peripheral surface of the base tube portion 42a.

Moreover, a portion of the outer peripheral surface of the base tube portion 42a where the PTC elements 43, 43 . . . are disposed and an inner periphery of the PTC holding member 52 respectively have polygonal shapes, for example, hexagonal shapes corresponding to each other. Multiple protruding portions 52a, 52a . . . are provided in a protruding manner in the PTC holding member 52, disposed at positions corresponding to corner portions of the polygonal shape, respectively, and protruding to a side opposite to the flange portion 42d. Each of the protruding portions 52a, 52a . . . is disposed between corresponding adjacent two of the multiple PTC elements 43, 43 . . . disposed on the outer peripheral surface of the base tube portion 42a.

As shown in FIG. 7(a), the current-carrying member 44 is formed of multiple electrode portions 44a, 44a . . . , an annular convergence portion 44b, and a terminal portion 44c. The electrode portions 44a, 44a . . . are individually and elastically in contact with the multiple PTC elements 43, 43 . . . disposed on the outer peripheral surface of the base tube portion 42a. The convergence portion 44b commonly connects the electrode portions 44a, 44a . . . together. The terminal portion 44c has one end thereof connected to the convergence portion 44b. Positioning protruding portions 44d, 44d . . . protruding outward are provided in the convergence portion 44b in a protruding manner respectively at center portions between adjacent ones of the electrode portions 44a, 44a . . . .

The outer case 45 made of a synthetic resin is formed to have such a tubular shape that the multiple electrode portions 44a, 44a . . . are held by the inner peripheral surface of the outer case 45. Multiple positioning cutouts 53, 53 . . . are provided in one end of the outer case 45. The positioning protruding portions 44d, 44d . . . are fitted respectively to the positioning cutouts 53, 53 . . . to determine the position of the current-carrying member 44 in the peripheral direction. A pair of attachment protruding portions 45a, 45a projecting laterally from two positions in the other end of the outer case 45 with equal intervals in the peripheral direction are attached to the flange portion 42d of the inner case 42 respectively by bolts 54, 54.

Incidentally, the one end side of the outer case 45 is covered with a mold portion 47 made of a synthetic resin with the current-carrying member 44 arranged in the following way. The convergence portion 44b commonly continuous with the multiple electrode portions 44a, 44a . . . disposed inside the outer case 45 is disposed on the one end side of the outer case 45 in the axial direction, and part of the terminal portion 44c is positioned outside the outer case 45. Thus, the current-carrying-portion-side assembly 48 including at least the current-carrying member 44, the outer case 45, and a mold portion 47 is configured.

Figure 7:
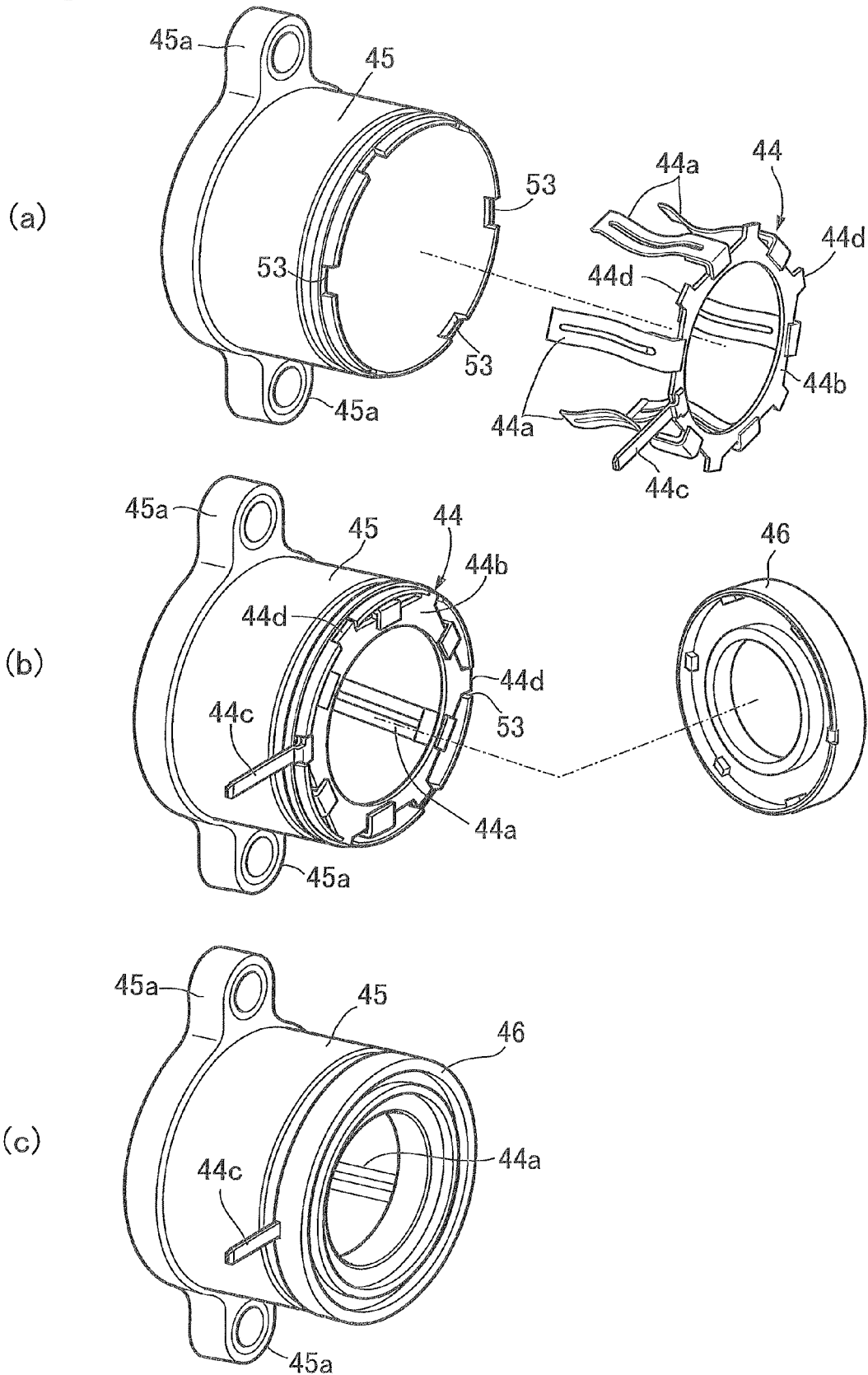
FIG. 7 is a view sequentially showing a process of attaching a current-carrying-portion-side assembly. (First Embodiment)

As shown in (b) and (c) of FIG. 7, a current-carrying member holding ring 46 with the convergence portion 44b of the current-carrying member 44 interposed between the current-carrying member holding ring 46 and the one end of the outer case 45 is fitted to one end portion of the outer case 45 in the axial direction. The mold portion 47 is formed to cover the current-carrying member holding ring 46. In other words, the current-carrying-portion-side assembly 48 is formed of the current-carrying member 44, the outer case 45, the current-carrying member holding ring 46, and the mold portion 47. Moreover, a connector portion 47a for disposing part of the terminal portion 44c as a connector terminal 55 is formed integrally with the mold portion 47.

The base tube portion 42a of the inner case 42 which have the PTC elements 43, 43 . . . disposed on the outer peripheral surface thereof is fitted to the current-carrying-portion-side assembly 48 from the one end side of the base tube portion 42a in the axial direction. An annular fifth sealing member 56 is interposed between an outer peripheral portion of the inner case 42 at one end thereof and one end of the current-carrying-portion-side assembly 48, and an annular sixth sealing member 57 is interposed between an outer peripheral portion of the inner case 42 at the other end thereof and the other end of the current-carrying-portion-side assembly 48.

A conduit member 58 for introducing LPG fuel is hermetically attached to a connection case in one end of the inner case 42 to be coaxial with the base tube portion 42a, for example, by being screwed therein. Gap passages 60 . . . forming at least part of a heated gas passage 59 connecting the conduit member 58 and the high-pressure gas passage 25 are formed between an inner peripheral surface of the base tube portion 42a and an outer peripheral surface of an insertion tube 61 inserted into the base tube portion 42a.

The insertion tube 61 is formed to have a bottomed cylindrical shape which has one end opened and the other end closed. The insertion tube 61 is inserted in the base tube portion 42a with a side opposite to the body 17 opened. Protruding portions 61a . . . , 61b for determining the position of the insertion tube 61 in the base tube portion 42a in the axial direction are provided in opposite ends of the insertion tube 61 in a protruding manner. The protruding portions 61a . . . are provided respectively at multiple positions in one end of the insertion tube 61 in a protruding manner to be in contact with the inwardly-projecting flange portion 42b of the inner case 42. Meanwhile, the protruding portion 61b is provided in the other end of the insertion tube 61 in a protruding manner to be in contact with an end wall 40a formed in the body 17 to form the inner end of the inlet-side connection hole 40.

Furthermore, multiple ribs 62 . . . are formed in a protruding manner in one of the inner peripheral surface of the base tube portion 42a and the outer peripheral surface of the insertion tube 61, the outer peripheral surface of the insertion tube 61 in this embodiment, with intervals in a peripheral direction, the ribs 62 . . . having tip ends thereof in contact with the other one of the inner peripheral surface of the base tube portion 42a and the outer peripheral surface of the inner tube, the inner peripheral surface of the base tube portion 42a in this embodiment. A corresponding one of the gap passages 60 . . . is formed between each two adjacent ribs 62 . . . .

The inner peripheral surface of the base tube portion 42a and the outer peripheral surface of the insertion tube 61 are each formed to have such a tapered shape that the diameter thereof becomes smaller toward the one side thereof in the axial direction. The insertion tube 61 is inserted into the base tube portion 42a from the one end side of the insertion tube 61 in the axial direction.

A passage portion 63 communicating with the high-pressure gas passage 25 of the body 17 is formed between the body 17 and the insertion tube 61 to be part of the heated gas passage 59, and the gap passages 60 . . . communicate with the high-pressure gas passage 25 via the passage portion 63.

Incidentally, the conduit member 58 integrally includes an entry conduit part 58a which has a diameter smaller than the inner diameter of the insertion tube 61 and which is coaxially inserted into the insertion tube 61. A metal filter 64 is fitted and fixed to an inner end portion of the entry conduit part 58a, for example, in such a way that an outer peripheral portion of the filter 64 is pressed into an inner periphery of the inner end portion of the entry conduit part 58a.

Returning to FIGS. 1 and 2, the gas passage cover member 18 is fastened to an outer peripheral portion of the body 17 in a way that one end portion of the cylinder portion 17a of the body 17 is fitted to the gas passage cover member 18. A pressure reducing chamber 66 communicating with the valve hole 27 is formed in the cylinder portion 17a, between the body 17 and the gas passage cover member 18. Moreover, a guide tube portion 18a which extends toward the pressure reducing chamber 66 and which is coaxial with the valve hole 27 is provided integrally with a center portion of the gas passage cover member 18.

A diaphragm rod 68 jointed to a center portion of the diaphragm 16 is slidably fitted to the guide tube portion 18a. An annular seventh sealing member 67 in slide-contact with an inner periphery of the guide tube portion 18a is attached to an outer periphery of the diaphragm rod 68. One end of the valve stem 30 is connected to the diaphragm rod 68.

The diaphragm rod 68 has a first retainer 69 being separate from the diaphragm rod 68 interposed between the diaphragm rod 68 and a center portion of one surface of the diaphragm 16. A shaft portion 68a coaxially provided in the diaphragm rod 68 penetrates the diaphragm 16 and a second retainer 70 in contact with a center portion of the other surface of the diaphragm 16, and the shaft portion 68a is crimped to cause the shaft portion 68a to engage with the second retainer 70. Thus, the diaphragm rod 68 is joined to the center portion of the diaphragm 16 with the first and second retainers 69, 70 interposed between the diaphragm rod 68 and the center portion of the diaphragm 16. As a result, a diaphragm assembly 71 including at least the diaphragm 16, the first retainer 69, the second retainer 70, and the diaphragm rod 68 is assembled in advance before the valve stem 30 is connected to the diaphragm rod 68.

Figure 8:
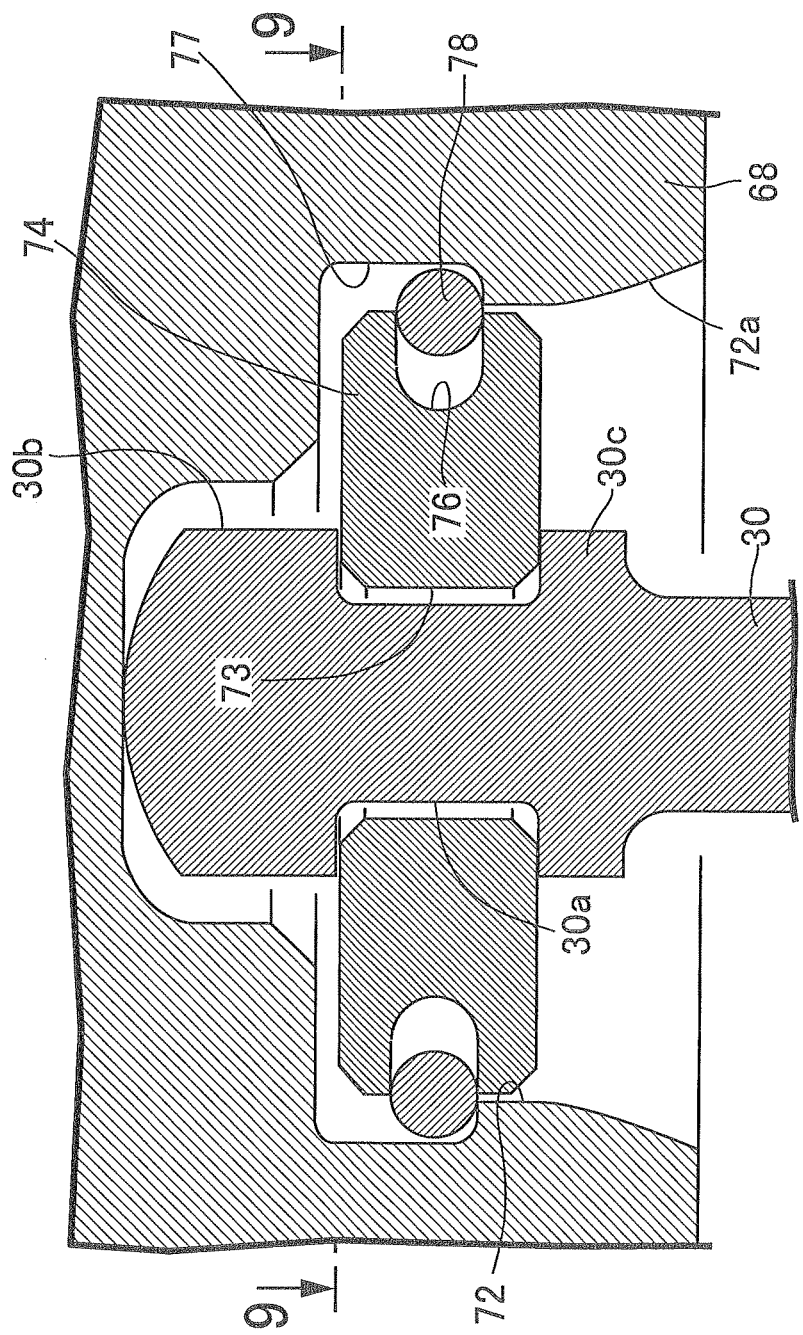
FIG. 8 is an enlarged view of a portion indicated by an arrow 8 in FIG. 2. (First Embodiment)
Figure 9:
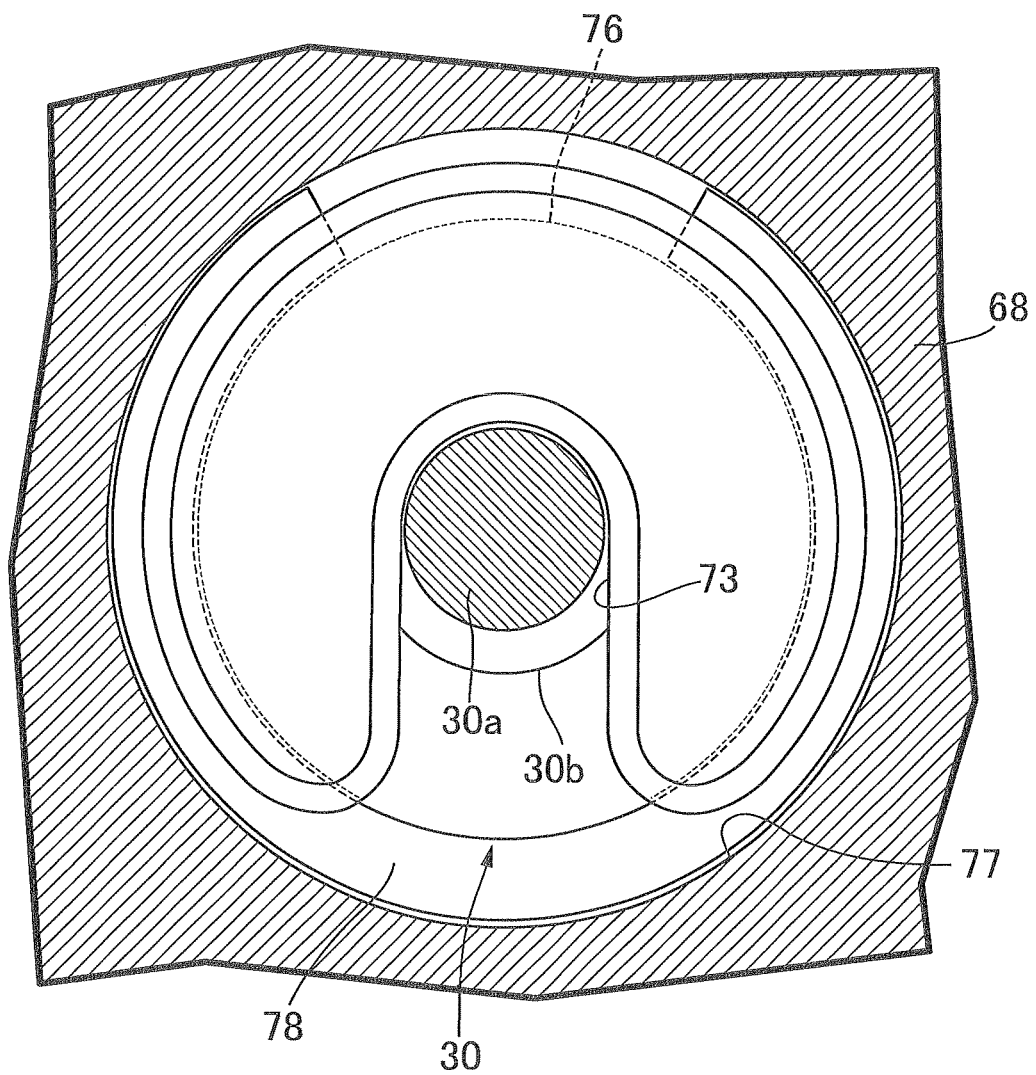
FIG. 9 is a sectional view take along a line 9-9 in FIG. 8. (First Embodiment)

Referring to FIGS. 8 and 9, an insertion recess portion 72 opening toward the valve mechanism 15 is coaxially provided in the diaphragm rod 68. A reduced diameter stem portion 30a and a pair of enlarged diameter stem portions 30b, 30c are provided in one end portion of the valve stem 30, the enlarged diameter stem portions 30b, 30c provided respectively on opposite sides of the reduced diameter stem portion 30a in the axial direction and each having a diameter larger than that of the reduced diameter stem portion 30a. Moreover, a holding plate 74 formed to have a substantially U-shaped cross section while having an engaging recess portion 73 opened to one side with a width larger than the outer diameter of the reduced diameter stem portion 30a but smaller than the outer diameters of the enlarged diameter stem portions 30b, 30c is inserted into the insertion recess portion 72 while the reduced diameter stem portion 30a is loosely inserted into the engaging recess portion 73 and thus the one end portion of the valve stem 30 is held by the holding plate 74 to be immovable relative thereto in the axial direction.

Furthermore, an arc-shaped first engaging groove 76 is provided in an outer periphery of the holding plate 74, and an annular second engaging groove 77 provided to correspond to the first engaging groove 76 is provided in an inner periphery of the insertion recess portion 72. An engaging ring 78 expandable and contractable in a radial direction of the valve stem 30 engages with the first and second engaging grooves 76, 77.

Further, when the valve stem 30 is connected to the diaphragm rod 68, the valve stem 30 is connected to the diaphragm rod 68 of the diaphragm assembly 71 assembled in advance. In this case, the holding plate 74 is inserted into the insertion recess portion 72 with the engaging ring 78 attached to the first engaging groove 76 of the holding plate 74 holding the one end portion of the valve stem 30. This causes the engaging ring 78 to engage with the first and second engaging grooves 76, 77, and thus the valve stem 30 is connected to the diaphragm rod 68. Moreover, in an open end of the insertion recess portion 72, a guide surface 72a used when the holding plate 74 is fitted is formed as a tapered surface whose diameter becomes smaller toward the inside.

In addition, the engaging ring 78 has a substantially C-shape. The engaging ring 78 engages with the first engaging groove 76 and the second engaging groove 77 in such a way that an open end of the engaging ring 78 is disposed at a position displaced from the open end of the engaging recess portion 73 on one side.

Incidentally, a pressure acting chamber 80 is formed between the gas passage cover member 18 and the one surface of the diaphragm 16, and a spring chamber 82 is formed between the other surface of the diaphragm 16 and the diaphragm cover 22. The diaphragm 16 is biased by a coil-shaped diaphragm spring 83 in such a direction that the capacity of the pressure acting chamber 80 is reduced. Note that, the spring load of the diaphragm spring 83 is adjustable.

An adjustment screw 86 is fitted to and supported by the shaft portion 68a of the diaphragm rod 68, which is linked to the valve body 29 via the valve stem 30 and which is joined to the center portion of the diaphragm 16, to be rotatable about an axis in the spring chamber 82. The adjustment screw 86 has a male screw 84 engraved on an outer peripheral surface and is provided with an engaging recess portion 85 in an end surface on a side opposite to the diaphragm rod 68. The male screw 84 in the outer periphery of the adjustment screw 86 is screwed to an inner periphery of a spring receiving member 87 which engages with an inner periphery of the diaphragm cover 22 to be incapable of rotating about an axis coaxial to the rotating axis of the adjustment screw 86 and which is housed in the spring chamber 82 to be moveable in the axial direction.

Figure 10:
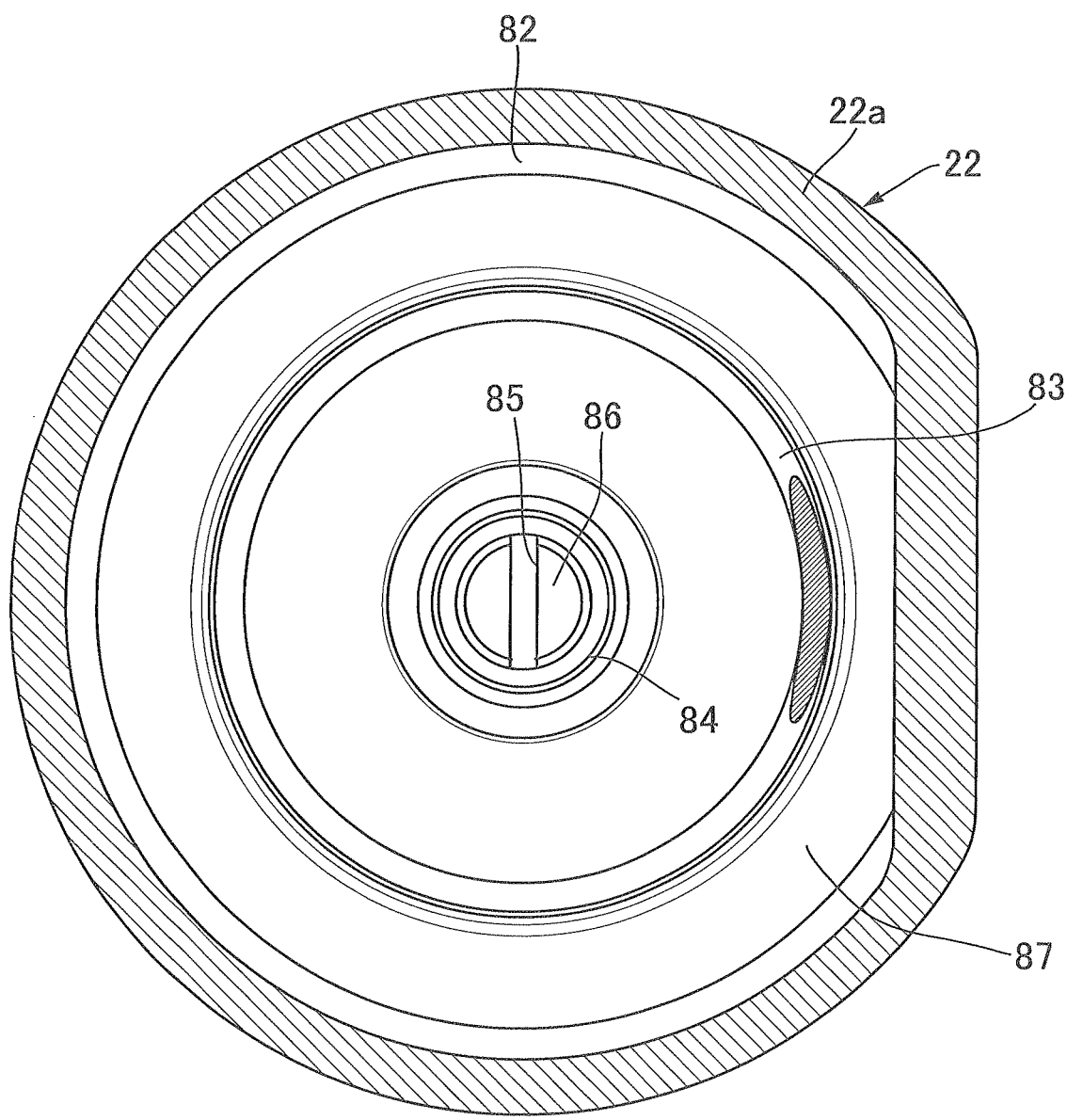
FIG. 10 is an enlarged sectional view take along a line 10-10 in FIG. 2. (First Embodiment)

The diaphragm cover 22 has a tube portion 22a having a non-circular cross-sectional shape as shown in FIG. 10, and is formed to have a hat shape having one end closed with an end wall 22b. The spring receiving member 87 engages with the inner surface of the tube portion 22a to be capable of moving in a direction along the axis of the tube portion 22a but to be incapable of rotating about the axis.

The diaphragm spring 83 being a coil spring is provided in a compressed state between the spring receiving member 87 and the end wall 22b of the diaphragm cover 22. A tool insertion hole 88 is provided in the end wall 22b of the diaphragm cover 22 at a position facing the end surface of the adjustment screw 86 in which the engaging recess portion 85 is provided. A cap 89 closing the tool insertion hole 88 is attached to the end wall 22b of the diaphragm cover 22.

A vacuum introduction pipe 91 communicating with the spring chamber 82 is provided in the diaphragm cover 22, and a pipe passage (not illustrated) for introducing an intake manifold vacuum of the engine is connected to the vacuum introduction pipe 91.

Figure 11:
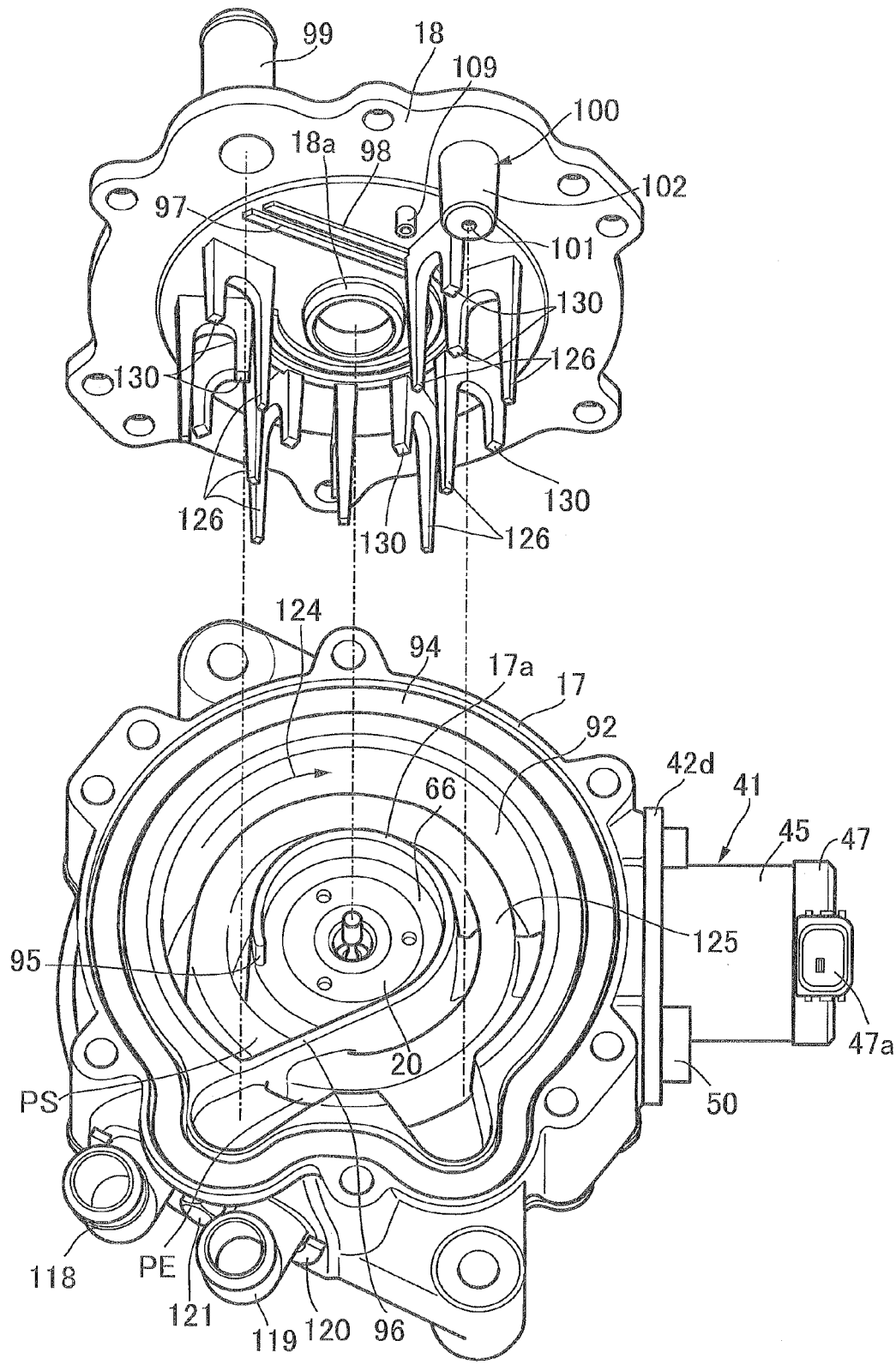
FIG. 11 is a perspective view in a state where a gas passage cover member is removed from a body. (First Embodiment)

Referring also to FIG. 11, a circular gas passage groove 92 surrounding the cylinder portion 17a provided integrally with the body 17 is provided in the body 17 to be opened toward the one surface of the body 17. A low-pressure gas passage 93 is formed of the gas passage groove 92 and the gas passage cover member 18 attached to the one surface of the body 17 to cover the gas passage groove 92. An annular eighth sealing member 94 is interposed between the body 17 and the gas passage cover member 18 in a portion outside the low-pressure gas passage 93.

Moreover, an opening portion 95 is provided at one portion in the cylinder portion 17a in the peripheral direction in such a way that part of the cylinder portion 17a is cut off, the opening portion 95 allowing the pressure reducing chamber 66 formed in the cylinder portion 17a to communicate with the low-pressure gas passage 93. An extending wall portion 96 which extends in a tangent line direction with one end portion thereof continuous with the cylinder portion 17a at one side of the opening portion 95 is provided integrally with the body 17 in such a way that the other end portion of the extending wall portion 96 is connected to the outer peripheral portion of the body 17. Meanwhile, a protruding portion 98 forming a fitting groove 97 to which the one end of the cylinder portion 17a and one end of the extending wall portion 96 are fitted is provided in the gas passage cover member 18 in a protruding manner to have a shape corresponding to a shape of the cylinder portion 17a and the extending wall portion 96 continuous with each other.

The LPG fuel flowing out from the pressure reducing chamber 66 to the low-pressure gas passage 93 flows inside the low-pressure gas passage 93 to almost circle round the cylinder portion 17a. A start point PS of the low pressure gas passage 93 is set at a position on one side of the extending wall portion 96 which is a side where the opening portion 95 is disposed, and an end point PE of the low-pressure gas passage 93 is set at a position on the other side of the extending wall portion 96.

Moreover, a gas outlet pipe 99 leading to the end point PE of the low-pressure gas passage 93 is provided in the gas passage cover member 18. In addition, a relief valve 100 protruding into the low-pressure gas passage 93 at a position near the end point PE is provided in the gas passage cover member 18. The relief valve 100 is formed of a valve housing 102, a valve body 104, a lid member 105, and a spring 106. The valve housing 102 is provided integrally with the gas passage cover member 18 to have a valve hole 101 communicating with the inside of the low-pressure gas passage 93 in a closed tip end portion of the valve housing 102, to have a cylindrical shape with a bottom, and to protrude into the low-pressure gas passage 93. The valve body 104 has a sealing portion 103 capable of closing the valve hole 101 at a tip end thereof, and is slidably fitted to the valve housing 102. The lid member 105 has a connection pipe portion 105a in conformity, and is fitted and fixed to an open end of the valve housing 102 by press fitting or the like. The spring 106 is provided in a compressed state between the lid member 105 and the valve body 104. The valve body 104 is formed to allow the LPG fuel discharged from the valve hole 101 to flow toward the connection pipe portion 105a in a state where the valve body 104 is opened.

A tube portion 109 is provided integrally with the gas passage cover member 18 to communicate with the low-pressure gas passage 93 at a position near the end point PE, the tube portion 109 protruding into the low-pressure gas passage 93 to form a communication passage 108 for causing the pressure inside the low-pressure gas passage 93 to act on the pressure acting chamber 80 to which the one surface of the diaphragm 16 faces.

Figure 12:
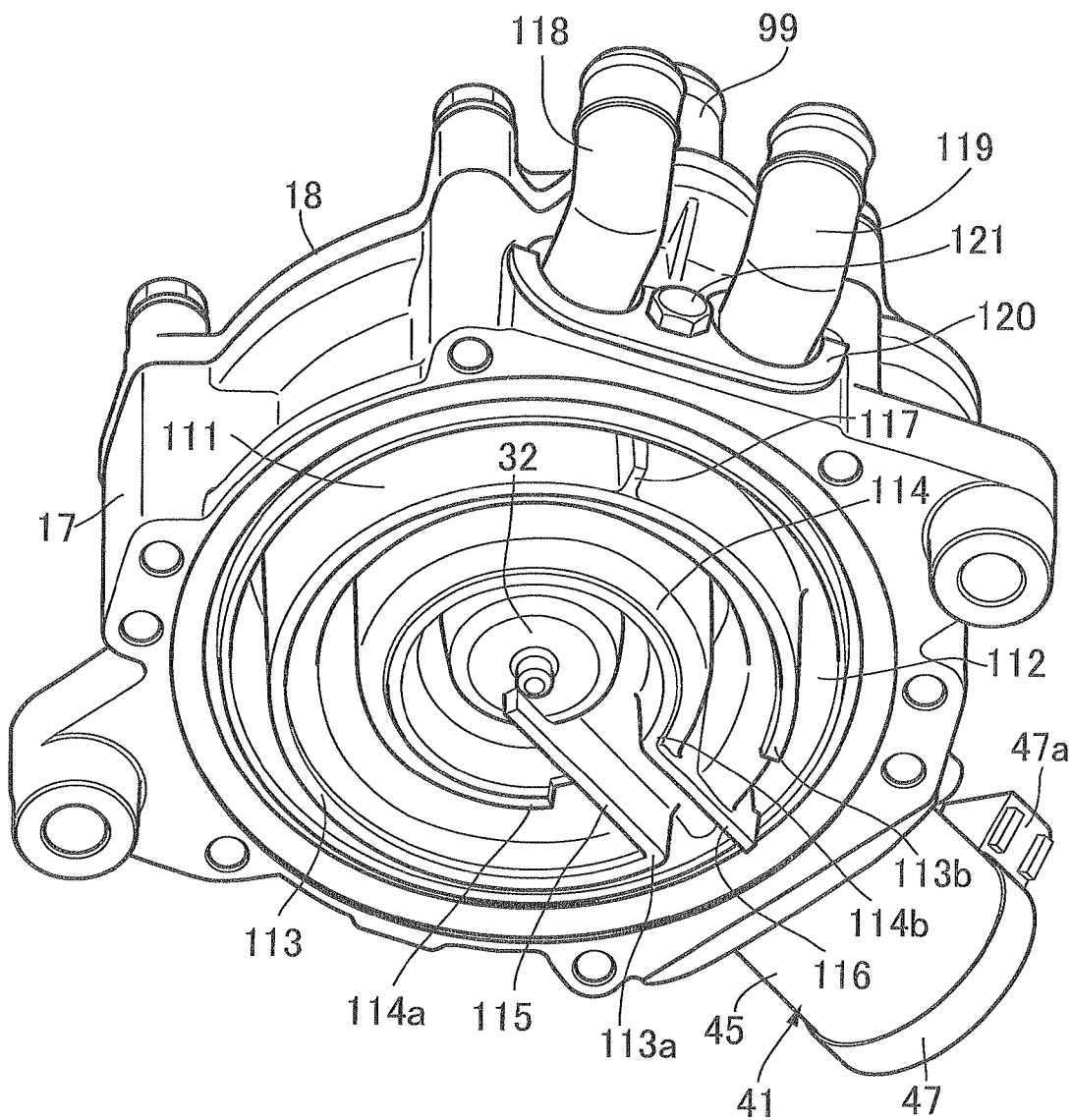
FIG. 12 is a perspective view in a state where a heating fluid passage cover member is removed from the body. (First Embodiment)

Referring also to FIG. 12, a heating fluid passage 110 through which an engine cooling water to be a heat source outside the low-pressure gas passage 93 flows is formed in the valve housing 21. A heating fluid passage groove 111 is provided in the other surface of the body 17 which is on the side opposite to the low-pressure gas passage 93. The heating fluid passage groove 111 and a heating fluid passage cover member 19 covering the heating fluid passage groove 111 and attached to the other surface of the body 17 form the heating fluid passage 110.

A recess portion 112 having a diameter larger than that of the gas passage groove 92 is provided on the other surface side of the body 17. An outer arc wall 113 and an inner arc wall 114 are provided integrally in the body 17. The outer arc wall 113 is formed to have an arc shape and disposed in the recess portion 112 at a position substantially corresponding to an outer periphery of the gas passage groove 92. The inner arc wall 114 is formed to have an arc shape and disposed in the recess portion 112 at a position substantially corresponding to an inner periphery of the gas passage groove 92. One end 114a of the inner arc wall 114 is disposed at a position displaced from one end 113a of the outer arc wall 113 to one side in the peripheral direction, and the other end 114b of the inner arc wall 114 is disposed at a position displaced from the other end 113b of the outer arc wall 113 to the one side in the peripheral direction.

Moreover, an outer end of a first radial direction wall 115 is provided to be orthogonally continuous with the one end 113a of the outer arc wall 113, the first radial direction wall 115 extending in the radial direction of the recess portion 112 to be disposed on the other side of the one end 114a of the inner arc wall 114 in the peripheral direction. An inner end of the first radial direction wall 115 is provided to be continuous with the end wall 32 closing the other end of the attachment hole 31. Moreover, an inner end of a second radial direction wall 116 is provided to be orthogonally continuous with the other end 114b of the inner arc wall 114, the second radial direction wall 116 extending in parallel with the first radial direction wall 115 to be disposed on the one side of the other end 113b of the outer arc wall 113 in the peripheral direction. An outer end of the second radial direction wall 116 is provided to be orthogonally continuous with the body 17 at the outer periphery of the recess portion 112. Furthermore, a separation wall 117 orthogonally connecting an intermediate portion of an outer periphery of the outer arc wall 113 and an outer periphery of the recess portion 112 is provided in the body 17.

The heating fluid passage groove 111 is formed by the recess portion 112, the outer arc wall 113, the inner arc wall 114, the first radial direction wall 115, the second radial direction wall 116, and the separation wall 117. The heating fluid passage 110 formed between the heating fluid passage groove 111 and the heating fluid passage cover member 19 includes a passage portion which causes the engine cooling water flowing into the heating fluid passage 110 at a position on one side of the separation wall 117 to flow along the outer periphery of the outer arc wall 113 to the second radial direction wall 116, a passage portion which guides the engine cooling water with the first and second radial direction walls 115, 116 to cause the engine cooling water to flow inside the inner arc wall 114, a passage portion which causes the engine cooling water to flow between the inner arc wall 114 and the outer arc wall 113 to the second radial direction wall 116, and a passage portion which causes the engine cooling water to flow along the outer periphery of the outer arc wall 113 to the other side of the separation wall 117.

A cooling water inlet pipe 118 and a cooling water outlet pipe 119 are fitted to a side portion of the body 17 in a liquid tight manner, the cooling water inlet pipe 118 being continuous with the heating fluid passage 110 on the one side of the separation wall 117 to introduce the engine cooling water into the heating fluid passage 110, the cooling water outlet pipe 119 being continuous with the heating fluid passage 110 on the other side of the separation wall 117 to drain the engine cooling water out from the heating fluid passage 110. A fitting-state maintaining plate 120 which commonly maintains fitting states of the cooling water inlet pipe 118 and the cooling water outlet pipe 119 to the body 17 is fastened to the body 17 by using a bolt 121. An annular ninth sealing member 122 is interposed between the body 17 and the heating fluid passage cover member 19 outside the heating fluid passage 110.

A single passage-longitudinal-direction protruding wall 125 and multiple passage-width-direction protruding walls 126 . . . are provided in the valve housing 21 of the pressure reducing valve to protrude into the low-pressure gas passage 93, the passage-longitudinal-direction protruding wall 125 extending in an arc shape along a normal flow direction 124 of the LPG fuel from the start point PS to the end point PE of the low-pressure gas passage 93, the passage-width-direction protruding walls 126 . . . being orthogonal to the normal flow direction 124 and extending in a width direction of the low-pressure gas passage 93.

Figure 13:
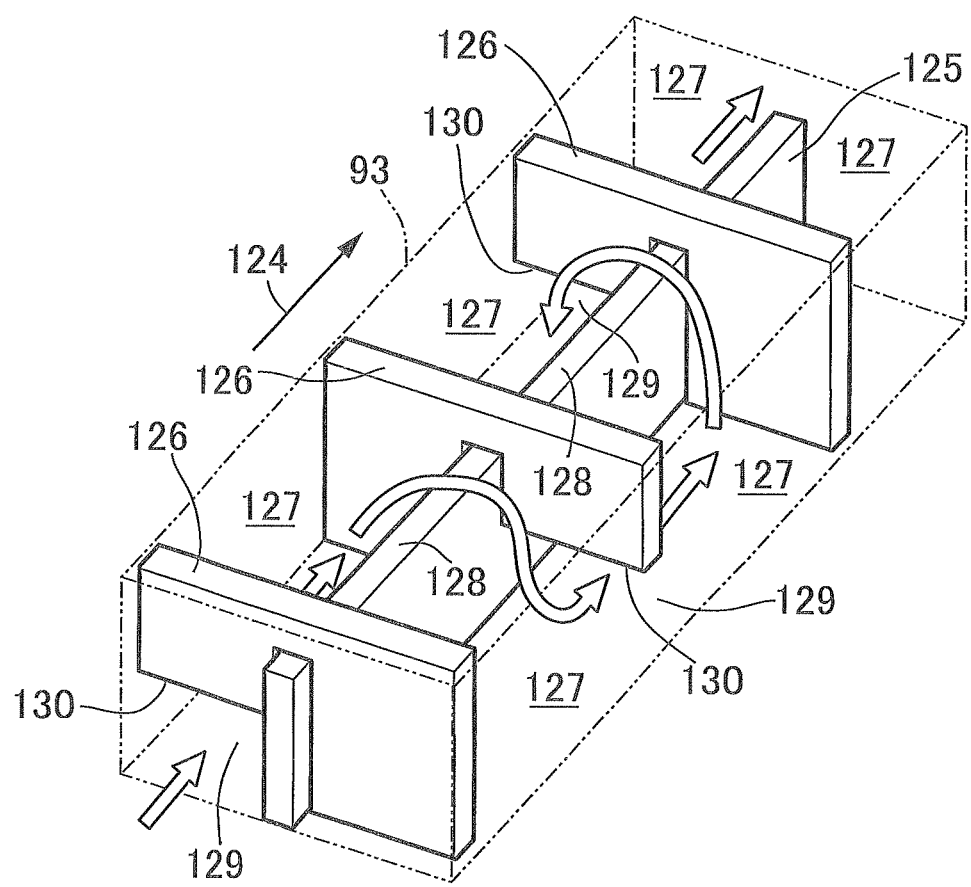
FIG. 13 is a perspective view schematically showing an arrangement and communication state of multiple passage chambers in a low-pressure gas passage. (First Embodiment)
Figure 14:
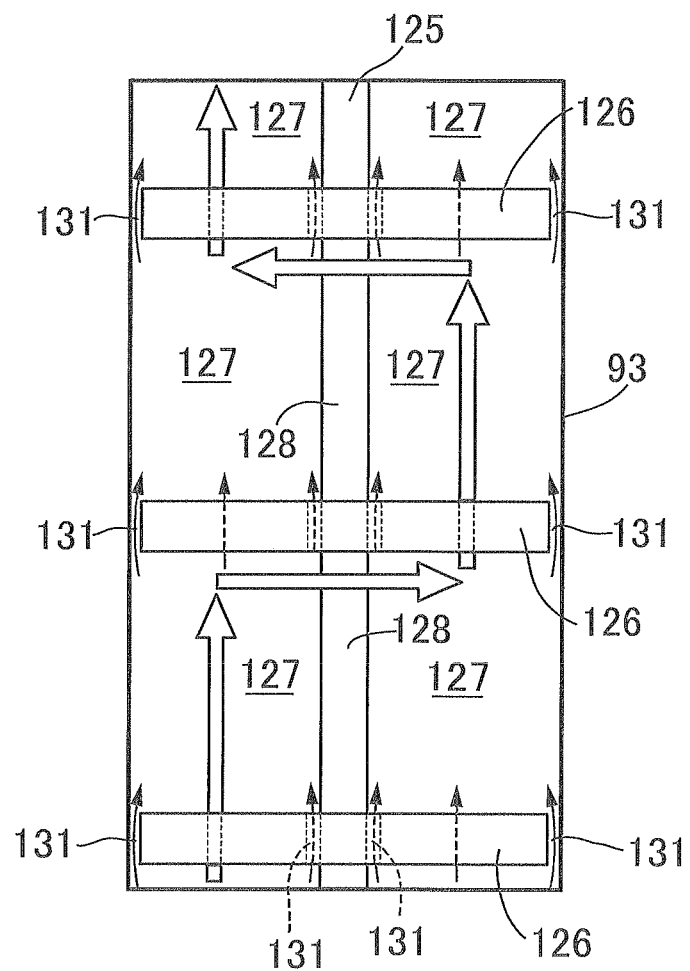
FIG. 14 is a plan view schematically showing the arrangement and communication state of the multiple passage chambers in the low-pressure gas passage. (First Embodiment)

Referring also to FIGS. 13 and 14, multiple passage chambers 127 . . . and multiple first and second communication passages 128 . . . , 129 . . . connecting adjacent ones of the passage chambers 127 . . . to each other in such a way that the LPG fuel sequentially flows through the passage chambers 127 . . . are formed in the low-pressure gas passage 93 by the cooperation of the body 17 and the gas passage cover member 18 of the valve housing 21 and the passage-longitudinal-direction protruding wall 125 and the passage-width-direction protruding walls 126 . . . . The first and second communication passages 128 . . . , 129 . . . are disposed in such a manner that the LPG fuel flows sequentially through the multiple passage chambers 127 . . . in zigzag from the start point PS to the end point PE of the low-pressure gas passage 93.

Each of the first communication passages 128 . . . connects corresponding two passage chambers 127, 127 which are adjacent to each other with the passage-longitudinal-direction protruding wall 125 interposed therebetween. Each of the second communication passages 129 . . . connects corresponding two passage chambers 127, 127 which are adjacent to each other with a corresponding one of the passage-width-direction protruding walls 126 . . . interposed therebetween. The first communication passages 128 . . . and the second communication passages 129 . . . are disposed respectively on sides opposite to each other in a protruding direction of the passage-longitudinal-direction protruding wall 125.

Incidentally, the low-pressure gas passage 93 is formed of the gas passage groove 92 provided in the body 17 and the gas passage cover member 18 covering the gas passage groove 92. The passage-longitudinal-direction protruding wall 125 and a group of the passage-width-direction protruding walls 126 . . . are each provided on either a bottom wall 92a of the gas passage groove 92 or the gas passage cover member 18 in a protruding manner. Moreover, one of the passage-longitudinal-direction protruding wall 125 and the group of the passage-width-direction protruding walls 126 . . . is provided on one of the bottom wall 92a of the gas passage groove 92 and the gas passage cover member in a protruding manner, and the other one of the passage-longitudinal-direction protruding wall 125 and the group of the passage-width-direction protruding walls 126 . . . is provided on the other one of the bottom wall 92a of the gas passage groove 92 and the gas passage cover member 18 in a protruding manner.

In this embodiment, the passage-longitudinal-direction protruding wall 125 is provided in a protruding manner on the bottom wall 92a of the gas passage groove 92 being one of the bottom wall 92a of the gas passage groove 92 and the gas passage cover member 18, and the passage-width-direction protruding walls 126 . . . formed to straddle the passage-longitudinal-direction protruding wall 125 are provided in a protruding manner in the low-pressure gas passage cover member 1 being the other one of the bottom wall 92a of the gas passage groove 92 and the gas passage cover member 19.

The first communication passages 128 . . . are formed between the tip end of the passage-longitudinal-direction protruding wall 125 and the gas passage cover member 18. Cutouts 130 . . . are provided respectively in tip ends of the passage-width-direction protruding walls 126 . . . to form the second communication passages 129 . . . between the tip ends of the passage-width-direction protruding walls 126 . . . and the bottom wall 92a of the gas passage groove 92a. In other words, the passage-longitudinal-direction protruding wall 125 is provided in a protruding manner in the bottom wall 92a of the gas passage groove 92 on a side where the second communication passages 129 . . . are disposed.

Incidentally, the length of each of the passage chambers 127 . . . in the normal flow direction 124 is set to be larger than the width of each of the passage chambers 127 . . . in the width direction of the low-pressure gas passage 93. The heating fluid passage 110 through which the engine cooling water flows is disposed at such a position that the bottom wall 92a is interposed between the heating fluid passage 110 and the low-pressure gas passage 93, the bottom wall 92a being a gas passage wall closer to the second communication passages 129 . . . in the protruding direction of the passage-longitudinal-direction protruding wall 125, among the gas passage cover member 18 and the bottom wall 92a of the gas passage groove 9 which are a pair of gas passage walls facing the low-pressure gas passage 93.

The engine cooling water to be the heat source is introduced into an inside of at least one of the passage-longitudinal-direction protruding wall 125 and the group of the passage-width-direction protruding walls 126 . . . . In this embodiment, a protruding wall provided in the body 17 in a protruding manner, i.e. the passage-longitudinal-direction protruding wall 125 provided in the bottom wall 92a of the gas passage groove 92 in a protruding manner is formed to have a hollow shape which is opened to the heating fluid passage 110 side to introduce the engine cooling water therein.

Moreover, minute gaps 131 . . . are formed between the passage-longitudinal-direction protruding wall 125 and the passage-width-direction protruding walls 126 . . . provided in a protruding manner from the gas passage cover member 18 being a gas passage wall forming one side surface of the low-pressure gas passage 93, and between the passage-width-direction protruding walls 126 . . . and side surfaces of the low-pressure gas passage 93 except for the gas passage cover member 18.

As described above, the passage-longitudinal-direction protruding wall 125 and the passage-width-direction protruding walls 126 . . . protrude into the low-pressure gas passage 93, and thus the multiple passage chambers 127 . . . and the multiple first and second communication passages 128 . . . , 129 . . . providing a communication between the passage chambers 127 . . . are formed in the low-pressure gas passage 93 by the cooperation of the body 17, the gas passage cover member 18, the passage-longitudinal-direction protruding wall 125, and the passage-width-direction protruding walls 126 . . . . Thus, as shown by open arrows in FIGS. 13 and 14, the LPG fuel flows in the low-pressure gas passage 93 in a zigzag along a three-dimensional flow path formed by a combination of flows in the width direction of the low-pressure gas passage 93 and flows in a direction orthogonal to the width direction of the low-pressure gas passage 93.

Incidentally, in the valve mechanism 15, a back pressure chamber 132 facing a back surface of the valve body 29 is formed between the end wall 32 and the valve body 29 in the small diameter tube portion 17b of the body 17. A communication hole 133 communicating the back pressure chamber 132 to the low-pressure gas passage 93 is provided in the body 17 to penetrate the low-pressure gas passage 93. An outer end opening portion of the communication hole 133 is hermetically closed with a lid member 134. Moreover, the communication hole 133 also penetrates the passage-longitudinal-direction protruding wall 125. Although the passage-longitudinal-direction protruding wall 125 is formed to basically have a hollow shape to introduce the engine cooling water therein, a portion of the passage-longitudinal-direction protruding wall 125 where the communication hole 133 is provided is formed to be solid.

Next, operations of the embodiment are described. The PTC heater unit 41 is attached to the side surface of the body 17 forming part of the valve housing 21 included in the pressure reducing valve for LPG fuel, the PTC heater unit 41 used to heat the LPG fuel flowing through the heated gas passage 59 between the high-pressure gas passage 25 provided in the body 17 and the conduit member 58 guiding the LPG fuel whose pressure is to be reduced. In the PTC heater unit 41, the gap passages 60 . . . forming at least part of the heated gas passage 59 are formed between the inner peripheral surface of the base tube portion 42*a* having the PTC elements 43 disposed on the outer peripheral surface thereof and the outer peripheral surface of the insertion tube 61 inserted into the base tube portion 42*a*. The inner peripheral surface of the base tube portion 42*a* which is an outer-side wall surface of the gap passages 60 . . . is designed to be a heat radiation surface, and all the LPG fuel flowing through the heated gas passage 59 is made to flow near the heat radiation surface. Thus, the heating efficiency of the LPG fuel can be improved.

Moreover, the multiple flat-plate-shaped PTC elements 43 are arranged on the outer peripheral surface of the base tube portion 42*a* in the polygonal shape in the view seen from the direction of the axis of the base tube portion 42*a*. Thus, the multiple flat-plate-shaped PTC elements 43 which are low in cost can be arranged to cover the base tube portion 42*a*, and the heating efficiency of the LPG fuel can be improved.

Furthermore, the multiple ribs 62 . . . are provided on the outer peripheral surface of the insertion tube 61 in a protruding manner with intervals in the peripheral direction, the ribs 62 . . . having tip ends thereof in contact with the inner peripheral surface of the base tube portion 42*a*. The corresponding one of the gap passages 60 . . . is formed between each two adjacent ribs 62 . . . . Thus, the position of the insertion tube 61 with respect to the base tube portion 42*a* in the radial direction can be easily determined in such a way that the gap passages 60 . . . are surely formed between the base tube portion 42*a* and the insertion tube 61.

In addition, the inner peripheral surface of the base tube portion 42*a* and the outer peripheral surface of the insertion tube 61 are each formed to have such a tapered shape that the diameter thereof becomes smaller toward the one side in the axial direction thereof, and the insertion tube 61 is inserted into the base tube portion 42*a* from the one end side of the insertion tube 61 in the axial direction. Thus, the insertion of the insertion tube 61 into the base tube portion 42*a* and the positioning of the insertion tube 61 in the base tube portion 42*a* are performed easily.

Moreover, the base tube portion 42*a* forms part of the inner case 42 having the flange portion 42*d* which is fastened to the body 17, and is directly connected to the body 17 forming the passage portion 63 continuous with the gap passages 60 . . . . Thus, the PTC heater unit 41 can be compactly attached the pressure reducing valve for LPG fuel.

Furthermore, the protruding portions 61*a*, 61*b* provided in opposite ends of the insertion tube 61 in the axial direction in a protruding manner are respectively in contact with the inwardly-projecting flange portion 42*b* provided in the base tube portion 42*a* and the end wall 40*a* formed in the body 17 in such a way that the position of the insertion tube 61 in the base tube portion 42*a* in the axial direction is determined. Thus, positioning of the insertion tube 61 in the axial direction can be easily performed.

Moreover, the insertion tube 61 is formed to have a bottomed cylindrical shape which has the one end in the axial direction opened and the other end in the axial direction closed. The entry conduit part 58*a* integrally included in the conduit member 58 coaxially attached to the base tube portion 42*a* has an outer diameter smaller than the inner diameter of the insertion tube 61 and is inserted into the insertion tube 61. The filter 64 is fitted and fixed to the inner end portion of the entry conduit part 58*a*. Thus, the filter 64 filtering the LPG fuel to be led into the gap passages 60 . . . can be disposed without having the size of the PTC heater unit 41 increased in a direction along the axes of the base tube portion 42*a* and the insertion tube 61. Moreover, the outer peripheral portion of the filter 64 which is made of metal is pressed into the inner periphery of the inner end portion of the entry conduit part 58*a*. Thus, the filter 64 can be fitted and fixed to the inner end portion of the entry conduit part 58*a* with a simple configuration.

Incidentally, the PTC heater unit 41 includes the inner case 42 having the base tube portion 42*a*, the multiple PTC elements . . . disposed on the outer peripheral surface of the base tube portion 42*a*, the current-carrying member 44 having the multiple electrode portions 44*a* . . . which are individually and elastically in contact with the multiple PTC elements 43 . . . , and the tubular outer case 45 holding the multiple electrode portions 44*a* . . . with the inner peripheral surface thereof, the multiple electrode portions 44*a* . . . having the PTC elements 43 . . . interposed between the electrode portions 44*a* . . . and the outer peripheral surface of the base tube portion 42*a*. The current-carrying member 44 is formed of the multiple electrode portions 44*a* . . . , the annular convergence portion 44*b* commonly connecting the multiple electrode portions 44*a* . . . together, and the terminal portion 44*c* having one end connected to the convergence portion 44*b*. The inner case 42 having the PTC elements 43 . . . disposed on the outer peripheral surface of the base tube portion 42*a* is fitted to the current-carrying-portion-side assembly 48 in which the one end side of the outer case 45 is covered with the mold portion 47 made of a synthetic resin with the current-carrying member 44 arranged in such a way that the convergence portion 44*b* commonly continuous with the multiple electrode portions 44*a* . . . disposed inside the outer case 45 is disposed on the one end side of the outer case 45 in the axial direction and that part of the terminal portion 44*c* is positioned outside the outer case 54, the current-carrying-portion-side assembly 48 including at least the current-carrying member 44, the outer case 45, and the mold portion 47.

Accordingly, there is no need for a member for holding the multiple PTC elements 43 and the multiple electrodes individually in contact with the PTC elements 43 . . . during the assembly work. Thus, the number of parts can be reduced, and forming the current-carrying-portion-side assembly 48 in advance can facilitate the assembly work while reducing the number of steps in the assembly work.

Furthermore, the connector portion 47*a* for disposing part of the terminal portion 44*c* as a connector terminal 55 is formed integrally with the mold portion 47. Thus, the connector portion 47*a* can be formed in a highly productive manner.

In addition, the annular sixth sealing member 56 is interposed between an outer peripheral portion of the inner case 42 at the one end thereof and the one end of the current-carrying-portion-side assembly 48, and the annular seventh sealing member 57 is interposed between the outer peripheral portion of the inner case 42 at the other end thereof and the other end of the current-carrying-portion-side assembly 48. Thus, by making the connector portion 47*a* waterproof, entrance of water or the like from a space between the inner case 42 and the current-carrying-portion-side assembly 48 can be prevented as long as a connector on a power source side is connected to the connector portion 47a.

Moreover, the current-carrying member holding ring 46 with the convergence portion 44b of the current-carrying member 44 interposed between the current-carrying member holding ring 46 and the one end of the outer case 45 is fitted to the one end portion of the outer case 45 in the axial direction, and the mold portion 47 is formed to cover the current-carrying member holding ring 46. Thus, the mold portion 47 can be formed in a state where the current-carrying member holding ring 46 is fitted to the one end portion of the outer case 45 and the current-carrying member 44 is thus held by the outer case 45. Moreover, the current-carrying member holding ring 46 prevents the molten resin from entering the inside of the outer case 45 during the formation of the mold portion 47. Thus, the mold portion 47 can be formed easily.

Furthermore, portions of the outer peripheral surface of the base tube portion 42a where the PTC elements 43 . . . are disposed are formed as the inclined surfaces each inclined in such a way that the surface becomes closer to the center axis of the base tube portion 42a toward the one end of the base tube portion 42a in the axial direction. The base tube portion 42a is fitted to the current-carrying-portion-side assembly 48 from the one end side of the base tube portion 42a in the axial direction. Thus, when the PTC heater unit 41 is to be assembled by fitting the inner case 42 to the current-carrying-portion-side assembly 48, the PTC elements 43 . . . can be easily brought into contact respectively with the electrode portions 44a . . . , and the assembly work is thereby facilitated.

In addition, the flange portion 42d protruding outward from the base tube portion 42a in the radial direction is provided integrally on the other end side of the metal inner case 42 in the axial direction. The annular PTC holding member 52 made of a synthetic resin is brought into contact with the flange portion 42d from the one end side of the base tube portion 42a in the axial direction, and the end portions of the respective PTC elements 43 . . . on the side close to the flange portion 42d are brought into contact with the PTC holding member 52. Thus, it is possible to position the PTC elements 43 . . . in the axial direction by using the PTC holding member 52 and to block an electrical current by using the PTC holding member 52, which would otherwise flow from the electrode portions 44a . . . to the flange portion 42d via the PTC elements 43 . . . during power on. Hence, the heat generation efficiencies of the PTC elements 43 . . . are improved.

Moreover, the portion of the outer peripheral surface of the base tube portion 42a where the PTC elements 43 are disposed and the inner periphery of the PTC holding member 52 are formed respectively to have the polygonal shapes corresponding to each other. The multiple protruding portions 52a are provided in the PTC holding member 52 in a protruding manner, disposed at the positions corresponding to the corner portions of the polygonal shape, respectively, and protruding to the side opposite to the flange portion 42d. Each of the protruding portions 52a is disposed between the corresponding two of the multiple PTC elements 43 . . . disposed on the outer peripheral surface of the base tube portion 42a. Thus, the PTC holding member 52 can also have a function of positioning the PTC elements 43 . . . in the peripheral direction of the base tube portion 42a. Hence, increase in the number of parts can be suppressed by having a single part to include multiple functions.

Incidentally, the valve stem 30 of the valve mechanism 15 is connected to the diaphragm rod 68 joined to the center portion of the diaphragm 16. Specifically, the reduced diameter stem portion 30a and the pair of enlarged diameter stem portions 30b, 30c are provided in the one end portion of the valve stem 30, the enlarged diameter stem portions 30b, 30c provided respectively on both sides of the reduced diameter stem portion 30a in the axial direction and each having a diameter larger than that of the reduced diameter stem portion 30a. The holding plate 74 formed to have the substantially U-shaped cross section while having the engaging recess portion 73 opened to one side with a width larger than the outer diameter of the reduced diameter stem portion 30a but smaller than the outer diameters of the enlarged diameter stem portions 30b, 30c is inserted into the insertion recess portion 72 while the reduced diameter stem portion 30a is loosely inserted into the engaging recess portion 73 and thus the one end portion of the valve stem 30 is held by the holding plate 74 to be immovable relative thereto in the axial direction. The engaging ring 78 expandable and contractable in a radial direction of the valve stem 30 engages with the arc-shaped first engaging groove 76 provided in the outer periphery of the holding plate 74 and the annular second engaging groove 77 provided in the inner periphery of the insertion recess portion 72 to correspond to the first engaging groove 76. Thus, the holding plate 74 and the diaphragm rod 68 are connected to each other.

Accordingly, the valve stem 30 can be connected to the diaphragm rod 68 with a simple structure using the diaphragm rod 68 and the holding plate 74 which are easily processed and having a low manufacturing cost, while an inclination of the diaphragm 16 with respect to a surface orthogonal to the valve stem direction and displacement of the axis of the diaphragm 16 side and the axis of the valve body side are allowed.

The substantially-C-shaped engaging ring 78 engages with the first engaging groove 76 and the second engaging groove 77 in such a way that the open end of the engaging ring 78 is disposed at the position displaced from the open end of the engaging recess portion 73 on the one side. Thus, the diaphragm rod 68 and the valve stem 30 can be connected to each other in such way that the holding plate 74 does not disengage from the valve stem 30, and the assembly work is thereby facilitated.

Moreover, the valve stem 30 is to be connected to the diaphragm rod 68 in the following way. The shaft portion 68a is coaxially provided in the diaphragm rod 68 arranged in such a manner that the first retainer 69 being separate from the diaphragm rod 68 is interposed between the diaphragm rod 68 and the center portion of the one surface of the diaphragm 16, the shaft portion 68a penetrating the diaphragm 16 and the second retainer 70 in contact with the center portion of the other surface of the diaphragm 16. The shaft portion 68a is crimped to cause the shaft portion 68a to engage with the second retainer 70, and thus the diaphragm assembly 71 including at least the diaphragm 16, the first retainer 69, the second retainer 70, and the diaphragm rod 68 is assembled in advance. The one end portion of the valve stem 30 is connected to the diaphragm rod 68 of the diaphragm assembly 71 by using the holding plate 74 and the engaging ring 78. Thus, the pressure reducing valve can be manufactured in the following way. The diaphragm assemblies 71 are assembled in a large number in advance by crimping, and the one end portion of the valve stem 30 is connected to the diaphragm rod 68 of each diaphragm assembly 71 by using the holding plate 74 and the engaging ring 78. This facilitates the assembly work of the pressure reducing valve while allowing the inclination of the diaphragm 16 with respect to the surface orthogonal to the valve stem direction and the displacement of the axis of the diaphragm 16 side and the axis of the valve body side.

Moreover, the diaphragm rod 68 continuous with the valve body 29 is joined to the diaphragm 16 while penetrating the center portion of the diaphragm 16. The adjustment screw 86 is fitted to and supported by the diaphragm rod 68 in the spring chamber 82 to be rotatable about the axis, the adjustment screw 86 having the male screw 84 engraved on the outer peripheral surface and provided with the engaging recess portion 85 in the end surface on the side opposite to the diaphragm rod 68. The male screw 84 in the outer periphery of the adjustment screw 86 is screwed to the inner periphery of the spring receiving member 87 which engages with the inner periphery of the diaphragm cover 22 to be incapable of rotating about the axis coaxial to the rotating axis of the adjustment screw 86 and which is housed in the spring chamber 82 to be moveable in the axial direction. The diaphragm spring 83 being a coil spring is provided in a compressed state between the spring receiving member 87 and the diaphragm cover 22.

Thus, the spring load of the diaphragm spring 83 generating a spring force biasing the diaphragm 16 in such a direction that the capacity of the pressure acting chamber 80 is reduced is adjusted in the following way. The position of the spring receiving member 87 in the axial direction is changed by causing a tool to engage with the engaging recess portion 85 and thereby performing a rotation operation of the adjustment screw 86. Thus, the spring receiving member 87 is moved in the direction along the axis of the adjustment screw 86, and the diaphragm spring 83 is expanded or contracted. To this end, the tool insertion hole 88 is provided in the diaphragm cover 22 at the position facing the end surface of the adjustment screw 86 where the engaging recess portion 85 is provided, and the cap 89 closing the tool insertion hole 88 is attached to the diaphragm cover 22. In other words, the adjustment screw 86 is housed in the spring chamber 82, and the tool insertion hole 88 is closed with the cap 89. Thus, the adjustment screw 87 is not externally visible, and it is thereby less likely that the adjustment screw 87 is undesirably operated by an end user.

Furthermore, in order to heat the LPG fuel flowing through the low-pressure gas passage 93 with the engine cooling water being the heat source, the passage-longitudinal-direction protruding wall 125 and the multiple passage-width-direction protruding walls 126 . . . are provided in the valve housing 21 to protrude into the low-pressure gas passage 93, the passage-longitudinal-direction protruding wall 125 extending in the normal flow direction 124 of the LPG fuel from the start point PS to the end point PE of the low-pressure gas passage 93, the passage-width-direction protruding walls 126 . . . being orthogonal to the normal flow direction 124 and extending in the width direction of the low-pressure gas passage 93. The multiple passage chambers 127 . . . and the multiple first and second communication passages 128 . . . , 129 . . . providing a communication between the adjacent passage chambers 127 . . . in such a way that the LPG fuel sequentially flows through the passage chambers 127 . . . are formed in the low-pressure gas passage 93 by the cooperation of the valve housing 21, the passage-longitudinal-direction protruding wall 125, and the passage-width-direction protruding walls 126 . . . . The first and second communication passages 128 . . . , 129 . . . are disposed in such a manner that the LPG fuel flows sequentially through the multiple passage chambers 127 . . . in zigzag from the start point PS to the end point PE of the low-pressure gas passage 93.

Accordingly, the flow path of the LPG fuel in the low-pressure gas passage 93 is long, and an area in which the LPG fuel is in contact with the valve housing 21, the passage-longitudinal-direction protruding wall 125, and the passage-width-direction protruding walls 126 . . . increase, and the efficiency of heat transmission to the LPG fuel is thereby improved. Moreover, compared to the conventional art using fins, the heat transmission efficiency at the time when the flow rate per unit time is large can be significantly increased.

In addition, the first communication passages 128 . . . each connecting corresponding two passage chambers 127, 127 which are adjacent to each other with the passage-longitudinal-direction protruding wall 125 interposed therebetween and the second communication passages 129 . . . each connecting corresponding two passage chambers 127, 127 which are adjacent to each other with a corresponding one of the passage-width-direction protruding walls 126 . . . interposed therebetween are disposed respectively on sides opposite to each other in the protruding direction of the passage-longitudinal-direction protruding wall 125. Thus, not only the LPG fuel flows in zigzag in the low-pressure gas passage 93, but also flows along a path also curved in a direction orthogonal to the width direction of the low-pressure gas passage 93. In other words, the low-pressure gas passage 93 is configured such that the LPG fuel flows along a three-dimensional flow path formed by a combination of flows in the width direction of the low-pressure gas passage 93 and flows in the direction orthogonal to the width direction of the low-pressure gas passage 93. Thus, the flow path of the LPG fuel is made longer and the area in which the LPG fuel is in contact with the heat transmission surface increases. Hence, the efficiency of heat transmission to the LPG fuel is improved.

Moreover, the length of each of the passage chambers 127 . . . in the normal flow direction 124 is set to be larger than the width of each of the passage chambers 127 . . . in the width direction of the low-pressure gas passage 93. The heating fluid passage 110 through which the engine cooling water flows is disposed in such a way that the bottom wall 92a is disposed between the heat source and the low-pressure gas passage 93, the bottom wall 92a being the one closer to the second communication passages 129 in the protruding direction of the passage-longitudinal-direction protruding wall 125, among the gas passage cover member 18 and the bottom wall 92a of the gas passage groove 92 which face the low-pressure gas passage 93. Thus, the LPG fuel passing through the second communication passages 129 . . . and flowing in the normal flow direction 124 can flow near the outer wall 92a for a longer period, and the heat transmission efficiency is thereby further improved.

The passage-longitudinal-direction protruding wall 125 is provided in the protruding manner on the bottom wall 92a being the gas passage wall closer to the second communication passages 129. Thus, the heat transmission efficiency can be improved by improving the heat transmission from the engine cooling water to the passage-longitudinal-direction protruding wall 125 and thereby allowing further more heat to be transmitted from the passage-longitudinal-direction protruding wall 125 extending in the normal flow direction 124 of the low-pressure gas passage 93 in an elongated manner.

Incidentally, at least part of the valve housing 21 is formed of the body 17 and the gas passage cover member 18 attached to the one surface of the body 17, and the low-pressure gas passage 93 is formed of the gas passage groove 92 provided on the one surface of the body 17 and the gas passage cover member 18 covering the gas passage groove 92. The passage-longitudinal-direction protruding wall 125 and the group of the passage-width-direction protruding walls 126 . . . are each provided on either the bottom wall 92a of the gas passage groove 92 or the gas passage cover member 18 in a protruding manner. Thus, the formation of the passage-longitudinal-direction protruding wall 125 and the passage-width-direction protruding walls 126 ... is facilitated.

Moreover, one of the passage-longitudinal-direction protruding wall 125 and the group of the passage-width-direction protruding walls 126 ... is provided on one of the bottom wall 92a of the gas passage groove 92 and the gas passage cover member 18 in a protruding manner, and the other one of the passage-longitudinal-direction protruding wall 125 and the group of the passage-width-direction protruding walls 126 ... is provided on the other one of the bottom wall 92a of the gas passage groove 92 and the gas passage cover member 18 in a protruding manner. Thus, the passage-longitudinal-direction protruding wall 125 and the group of the passage-width-direction protruding walls 126 ... are provided separately on the bottom wall 92a of the gas passage groove 92 and the gas passage cover member 18. Hence, the formation of the passage-longitudinal-direction protruding wall 125 and the passage-width-direction protruding walls 126 ... is further facilitated.

Moreover, the first communication passages 128 ... are formed between the tip end of the passage-longitudinal-direction protruding wall 125 and the bottom wall 92a of the gas passage groove 92 or the gas passage cover member 18, and the cutouts 130 ... for forming the second communication passages 129 ... between the tip ends of the passage-width-direction protruding walls 126 ... and the bottom wall 92a of the gas passage groove 92 or the gas passage cover member 18 are provided respectively in the tip ends of the passage-width-direction protruding walls 126 .... Thus, the formation of the first communication passages 128 ... and the second communication passages 129 ... is facilitated.

Moreover, the heating fluid passage groove 111 is provided in the other surface of the body 17 which is on the side opposite to the low-pressure gas passage 93. The heating fluid passage cover member 19 for forming the heating fluid passage 110 between the heating fluid passage cover member 19 and the heating fluid passage groove 111 covers the heating fluid passage groove 111 and is attached to the other surface of the body 17, the heating fluid passage 110 used to flow the engine cooling water therethrough. Thus, the heating fluid passage 110 can be formed easily. In addition, the heating fluid passage 110 can be disposed near the low-pressure gas passage 93. Thus, it is possible to improve the heat transmission efficiency and configure a compact heating device.

The engine cooling water is led into at least one of the passage-longitudinal-direction protruding wall 125 and the group of the passage-width-direction protruding walls 126 .... Thus, the heat transmission efficiency can be further improved by effectively heating at least one of the passage-longitudinal-direction protruding wall 125 and the group of the passage-width-direction protruding walls 126 ... with the engine cooling water, and thereby causing at least one of the passage-longitudinal-direction protruding wall 125 and the group of the passage-width-direction protruding walls 126 ... to effectively function as a surface transmitting heat to the LPG fuel.

In addition, the engine cooling water is led into a protruding wall provided in the body 17 in a protruding manner among the passage-longitudinal-direction protruding wall 125 and the passage-width-direction protruding walls 126 ..., in this embodiment, the passage-longitudinal-direction protruding wall 125 provided on the bottom wall 92a of the gas passage groove 92 in a protruding manner. Thus, a structure for leading the engine cooling water into the passage-longitudinal-direction protruding wall 125 can be made simple.

Incidentally, the LPG fuel is likely to stagnate on a side of a wall surface of each of the passage-width-direction protruding walls 126 ... which faces downstream in the normal flow direction 124. To this end, the minute gaps 131 ... are formed between the passage-longitudinal-direction protruding wall 125 and the passage-width-direction protruding walls 126 provided in a protruding manner from the gas passage cover member 18 being the gas passage wall forming the one side surface of the low-pressure gas passage 93, and between the passage-width-direction protruding walls 126 and the other gas passage walls of the low-pressure gas passage 93. Thus, a small amount of the LPG fuel flows through the minute gaps 131 ... as shown by arrows drawn in thin lines in FIGS. 13 and 14, and the stagnation is made less likely to occur. Hence, the wall surface of each of the passage-width-direction protruding walls 126 ... which faces downstream in the normal flow direction 124 is effectively used as the heat transmission surface. This contributes to improvement in heat transmission efficiency.

Moreover, a pressure reducing valve for LPG fuel having excellent heat transmission efficiency can be obtained by applying a heating structure using the engine cooling water as described above to a pressure reducing valve having the low-pressure gas passage 93 through which the LPG fuel with reduced pressure flows. In addition, the body 17 housing the valve mechanism 15 is configured to be part of the valve housing 21 being a passage formation body forming the low-pressure gas passage 93. Thus, the pressure reducing valve for LPG fuel to which the heating device is attached can be compactly configured.

An embodiment of the present invention has been described above. However, the present invention is not limited the embodiment described above, and various design changes can be made without departing from the gist of the present invention.

For example, the diaphragm rod 68 and the first retainer 69 are separate bodies in the embodiment described above. However, a first retainer in contact with the center portion of one surface of the diaphragm 16 may be provided integrally with a diaphragm rod.

The invention claimed is:

1. A valve stem connection structure of a pressure reducing valve for connecting a valve stem (30) to a diaphragm rod (68) joined to a center portion of a diaphragm (16), the valve stem (30) coaxially joined to a valve body (29) of a valve mechanism (15) housed in a body (17), characterized in that an insertion recess portion (72) opened toward the valve mechanism (15) is coaxially provided in the diaphragm rod (68), a reduced diameter stem portion (30a) and a pair of enlarged diameter stem portions (30b, 30c) are provided in one end portion of the valve stem (30), the enlarged diameter stem portions (30b, 30c) provided respectively on opposite sides in an axial direction of the reduced diameter stem portion (30a) and each having a diameter larger than that of the reduced diameter stem portion (30a), a holding plate (74) formed to have a substantially U-shaped cross section while having an engaging recess portion (73) opened to one side with a width larger than an outer diameter of the reduced diameter stem portion (30a) but smaller than outer diameters of the enlarged diameter stem portions (30b, 30c) is inserted into the insertion recess portion (72) while the reduced diameter stem portion (30a) is loosely inserted into the engaging recess portion (73) and thus the one end portion of the valve stem (30) is held by the holding plate (74) to be immovable relative to the holding plate (74) in the axial direction, and the holding plate (74) and the diaphragm rod (68) are connected to each other by causing an engaging ring (78) expandable and contractable in a radial direction of the valve stem (30) to engage with an arc-shaped first engaging groove (76) provided in an outer periphery of the holding plate (74) and an annular second engaging groove (77) provided in an inner periphery of the insertion recess portion (72) to correspond to the first engaging groove (76).

2. The valve stem connection structure of a pressure reducing valve according to claim 1, wherein the engaging ring (78) having a substantially C-shape engages with the first engaging groove (76) and the second engaging groove (77) in such a way that an open end of the engaging ring (78) is disposed at a position displaced from an open end of the engaging recess portion (73) on the one side.

3. A method of connecting the valve stem of a pressure reducing valve, wherein, when the valve stem connection structure of a pressure reducing valve according to claim 1 or 2 is used to connect the valve stem (30) to the diaphragm rod (68), the diaphragm rod (68) with a first retainer (69) which is separate from the diaphragm rod (68) and which is interposed between the diaphragm rod (68) and a center portion of one surface of the diaphragm (16) or a diaphragm rod integrally having a first retainer which is in contact with the center portion of the one surface of the diaphragm (16) is coaxially provided with a shaft portion (68*a*) penetrating the diaphragm (16) and a second retainer (70) which is in contact with a center portion of the other surface of the diaphragm (16), the shaft portion (68*a*) is crimped to engage with the second retainer (70), and thus a diaphragm assembly (71) including at least the diaphragm (16), the first retainer (69), the second retainer (70), and the diaphragm rod (68) is assembled in advance, and the one end portion of the valve stem (30) is connected to the diaphragm rod (68) of the diaphragm assembly (71) by using the holding plate (74) and the engaging ring (78).

* * * * *